US011304219B2

(12) United States Patent
Fakoorian et al.

(10) Patent No.: US 11,304,219 B2
(45) Date of Patent: Apr. 12, 2022

(54) SCHEDULING ACROSS SLOT BOUNDARIES

(71) Applicant: QUALCOMM Incorporated, San Diego, CA (US)

(72) Inventors: Seyed Ali Akbar Fakoorian, San Diego, CA (US); Seyedkianoush Hosseini, San Diego, CA (US); Wanshi Chen, San Diego, CA (US); Jing Jiang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 156 days.

(21) Appl. No.: 16/737,784

(22) Filed: Jan. 8, 2020

(65) Prior Publication Data

US 2020/0221478 A1 Jul. 9, 2020

Related U.S. Application Data

(60) Provisional application No. 62/891,846, filed on Aug. 26, 2019, provisional application No. 62/891,255, (Continued)

(51) Int. Cl.
*H04W 72/12* (2009.01)
*H04W 72/04* (2009.01)
(Continued)

(52) U.S. Cl.
CPC ........ *H04W 72/1268* (2013.01); *H04B 1/713* (2013.01); *H04L 1/1812* (2013.01);
(Continued)

(58) Field of Classification Search
CPC ......... H04W 72/1268; H04W 72/0413; H04W 72/042; H04W 72/0446; H04W 72/1289;
(Continued)

(56) References Cited

U.S. PATENT DOCUMENTS

2019/0274032 A1 9/2019 Chatterjee et al.
2020/0128579 A1* 4/2020 Talarico ................ H04L 5/0057

FOREIGN PATENT DOCUMENTS

WO 2018175420 A1 9/2018

OTHER PUBLICATIONS

International Search Report and Written Opinion—PCT/US2020/012981—ISA/EPO—dated May 7, 2020.
(Continued)

*Primary Examiner* — Peter G Solinsky
(74) *Attorney, Agent, or Firm* — Terry Tsai

(57) ABSTRACT

Systems and methods for scheduling uplink transmissions are disclosed. In an aspect, a user equipment (UE) receives a downlink control information signal, wherein the downlink control information indicates an uplink grant for multiple contiguous nominal uplink repetitions, identifies resources allocated for the multiple contiguous nominal uplink repetitions based on the uplink grant, wherein the identified resources include first resources for a first actual repetition of uplink data and second resources for a second actual repetition of uplink data, transmits the first actual repetition of uplink data using the first resources, and transmits the second actual repetition of the uplink data using the second resources.

46 Claims, 11 Drawing Sheets

Related U.S. Application Data filed on Aug. 23, 2019, provisional application No. 62/865,690, filed on Jun. 24, 2019, provisional application No. 62/790,098, filed on Jan. 9, 2019.

(51) Int. Cl.
| | |
|---|---|
| *H04L 5/00* | (2006.01) |
| *H04B 1/713* | (2011.01) |
| *H04W 72/14* | (2009.01) |
| *H04L 1/18* | (2006.01) |
| *H04W 28/06* | (2009.01) |

(52) U.S. Cl.
CPC ........... *H04L 5/0053* (2013.01); *H04W 28/06* (2013.01); *H04W 72/042* (2013.01); *H04W 72/0413* (2013.01); *H04W 72/0446* (2013.01); *H04W 72/1289* (2013.01); *H04W 72/14* (2013.01)

(58) Field of Classification Search
CPC ...... H04W 72/14; H04W 28/06; H04B 1/713; H04L 1/1812; H04L 5/0053
USPC ......................................................... 370/329
See application file for complete search history.

(56) References Cited

OTHER PUBLICATIONS

Ericsson: "Enhancements to Uplink and Downlink Physical Channels for NR URLLC", 3GPP TSG-RAN WG1 Meeting #94bis, R1-1810174, Chengdu, China, Oct. 8-12, 2018, 12 pages.

Huawei et al., "PUSCH Enhancements for URLLC", 3GPP TSG RANWG1 Meeting #95, R1-1812223, Spokane, USA, Nov. 12-16, 2018, 6 pages.

Nokia et al., "Summary of 7.2.6.1.3 Potential Enhancements for PUSCH for NR URLLC", 3GPP TSG RAN WG1 Meeting #95, R1-1814098, Spokane, US, Nov. 12-16, 2018, 12 pages.

"3rd Generation Partnership Project; Technical Specification Group Radio Access Network; Study on Physical Layer Enhancements for NR Ultra-reliable and Low Latency Case (URLLC) (Release 16)", 3GPP Draft, 38824-100, 3rd Generation Partnership Project (3GPP), Mobile Competence Centre, 650, Route Des Lucioles, F-06921, Sophia-Antipolis Cedex, France, Dec. 9, 2018 (Dec. 9, 2018), XP051553062, 22 pages, Retrieved from the Internet: URL: http://www.3gpp.org/ftp/Meetings%5F3GPP%5FSYNC/RAN/Docs/RP%2D182481%2Ezip [retrieved on Dec. 9, 2018] section "6.3 PUSCH Enhancements" and sub-sections, section "8.2.1 Multiple active configured grants", section "8.2.2 Ensuring K repetitions", section "8.2.3 PUSCH repetitions within a slot for grant free transmission", section "8.2.4 Explicit HARQ-ACK for UL configured grant transmission".

Huawei, et al., "Enhanced UL Configured Grant Transmissions," 3GPP Draft, 3GPP TSG RAN WG1 Meeting #95, R1-1812226. 3rd Generation Partnership Project (3GPP), Mobile Competence Centre, 650, Route Des Lucioles, F-06921, Sophia-Antipolis Cedex, France, vol. RAN WG1. No. Spokane, USA; Nov. 12, 2018-Nov. 16, 2018, Nov. 11, 2018 (Nov. 11, 2018), XP051554098, 10 pages, Retrieved from the Internet: URL: http://www.3gpp.org/ftp/Meetings%5F3GPP%5FSYNC/RAN1/Docs/R1%2D1812226%2Ezip retrieved on Nov. 11, 2018], Observation 1: Option 1 (i.e. multiple active configured grant configurations for BWP of a serving cell) can be combined with Option 2 (i.e. repetitions across the boundary of a period P) to simultaneously support different URLLC services with stringent requirements on both latency and reliability, section "4 K repetitions across a period boundary"; section "6 Other enhancements", e.g.: Explicit HARQ-ACK feedback, etc.

LG Electronics: "Discussion on Enhancement for Grant-free Transmission," 3GPP Draft, 3GPP TSG RAN WG1 Meeting #95, R1-1812578, Discussion on Enhancement for Grant-free Transmission, 3rd Generation Partnership Project (3GPP), Mobile Competence Centre, 650, Route Des Lucioles, F-06921, Sophia-Antipolis Cedex, France, vol. RAN WG1, No. Spokane. USA; Nov. 12, 2018-Nov. 16, 2018, Nov. 11, 2018 (Nov. 11, 2018), XP051554523, 9 pages, Retrieved from the Internet: URL: http://www.3gpp.org/ftp/Meetings%5F3GPP%5FSYNC/RAN1/Docs/R1%2D1812578%2Ezip [retrieved on Nov. 11, 2018], Main focus on "Option 2: repetition(s) across the boundary of a period P", section "4. Non-slot Repetition within a Slot", Figures 1.2. 3; Section "4.1. Ensuring K times of repetitions with non-slot repetition; section" 5, Dynamic indication of number of repetition K; Proposals 1-7.

Samsung: "Potential Enhancement for UL Grant-free Transmission," 3GPP Draft, 3GPP TSG RAN WG1 Meeting #95, R1-1812999, EURLLC Grant Free, 3rd Generation Partnership Project (3GPP), Mobile Competence Centre, 650, Route Des Lucioles, F-06921, Sophia-Antipolis Cedex, France, vol. RAN WG1, No. Spokane. USA; Nov. 12, 2018-Nov. 16, 2018, Nov. 11, 2018 (Nov. 11, 2018), XP051554979, 6 pages, Retrieved from the Internet: URL: http://www.3gpp.org/ftp/Meetings%5F3GPP%5FSYNC/RAN1/Docs/R1%2D1812999%2Ezip [retrieved on Nov. 11, 2018], Option 1. Option 2. Option 3, section 3 Repetition/Transmission across the boundary of a period P, section "4 Mini-slot Repetition for Configured Grant", Figure 2, Figure 3; section "6 HARQ-ACK mechanism", Proposals 1. 3, 4. 6.

ZTE: "Enhancement for UL Grant-free Transmissions", 3GPP Draft, 3GPP TSG RAN WG1 Meeting #95, R1-1813884, E Enhancement for UL grant-free Transmissions, 3rd Generation Partnership Project (3GPP), Mobile Competence Centre, 650, Route Des Lucioles, F-06921, Sophia-Antipolis Cedex, France, vol. RAN WG1. No. Spokane. USA, Nov. 12, 2018-Nov. 16, 2018, Nov. 13, 2018 (Nov. 13, 2018), XP051480093, 9 pages, Retrieved from the Internet: URL: http://www.3gpp.org/ftp/tsg%5Fran/WG1%5FRL1/TSGR1%5F95/Docs/R1%2D1813884%2Ezip [retrieved on Nov. 13, 2018], section "3. Ensuring K repetitions"; e.g.: "Another point related to ensuring repetitions is whether and how to support mini-slot repetitions across slot boundary. An example with K=4 is shown in Figure 3"; e.g: "Thus, we suggest to support repetitions across slot boundary for grant-free PUSCH"; Figure 3 K repetitions across the slot boundary; section 4.Support of multiple active configured grant configurations, Proposals 1-10.

\* cited by examiner

SCHEDULING ACROSS SLOT BOUNDARIES

CROSS-REFERENCE TO RELATED APPLICATIONS

The present Application for Patent claims the benefit of U.S. Provisional Application No. 62/891,846, entitled "SCHEDULING ACROSS SLOT BOUNDARIES," filed Aug. 26, 2019, of U.S. Provisional Application No. 62/891,255, entitled "SCHEDULING ACROSS SLOT BOUNDARIES," filed Aug. 23, 2019, of U.S. Provisional Application No. 62/865,690, entitled "SCHEDULING ACROSS SLOT BOUNDARIES," filed Jun. 24, 2019, and of U.S. Provisional Application No. 62/790,098, entitled "SCHEDULING ACROSS SLOT BOUNDARIES," filed Jan. 9, 2019, each assigned to the assignee hereof, and expressly incorporated herein by reference in their entirety.

INTRODUCTION

1. Field of the Disclosure

Aspects of this disclosure relate generally to telecommunications, and more particularly to scheduling across slot boundaries.

2. Background

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard, referred to as "New Radio" (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Latency reduction has also emerged as a critical issue. Some applications, for example, autonomous driving systems, telesurgical applications, etc., cannot function safely and/or effectively if latency is too high. Accordingly, 5G systems may incorporate standards for ultra reliable low latency communications (URLLC), attempting to ensure that latencies are reduced to a duration of one millisecond or less. New techniques are necessary for achieving these goals.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes receiving a downlink control information signal, wherein the downlink control information signal indicates an uplink grant for multiple contiguous nominal uplink repetitions; identifying resources allocated for the multiple contiguous nominal uplink repetitions based on the uplink grant, wherein the identified resources include first resources for a first actual repetition of uplink data and second resources for a second actual repetition of uplink data; transmitting the first actual repetition of uplink data using the first resources; and transmitting the second actual repetition of the uplink data using the second resources.

In an aspect, a UE includes at least one transceiver; and at least one processor, the at least one processor configured to: receive, via the at least one transceiver, a downlink control information signal, wherein the downlink control information indicates an uplink grant for multiple contiguous nominal uplink repetitions; identify resources allocated for the multiple contiguous nominal uplink repetitions based on the uplink grant, wherein the identified resources include first resources for a first actual repetition of uplink data and second resources for a second actual repetition of uplink data; cause the at least one transceiver to transmit the first actual repetition of uplink data using the first resources; and cause the at least one transceiver to transmit the second actual repetition of the uplink data using the second resources.

In an aspect, a UE includes means for receiving a downlink control information signal, wherein the downlink control information indicates an uplink grant for multiple contiguous nominal uplink repetitions; means for identifying resources allocated for the multiple contiguous nominal uplink repetitions based on the uplink grant, wherein the identified resources include first resources for a first actual repetition of uplink data and second resources for a second actual repetition of uplink data; means for transmitting the first actual repetition of uplink data using the first resources; and means for transmitting the second actual repetition of the uplink data using the second resources.

In an aspect, a non-transitory computer-readable medium storing computer-executable instructions includes computer-executable instructions comprising at least one instruction instructing a UE to receive a downlink control information signal, wherein the downlink control information indicates an uplink grant for multiple contiguous nominal uplink repetitions; at least one instruction instructing the UE to identify resources allocated for the multiple contiguous nominal uplink repetitions based on the uplink grant, wherein the identified resources include first resources for a first actual repetition of uplink data and second resources for a second actual repetition of uplink data; at least one instruction instructing the UE to transmit the first actual repetition of uplink data using the first resources; and at least one instruction instructing the UE to transmit the second actual repetition of the uplink data using the second resources.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
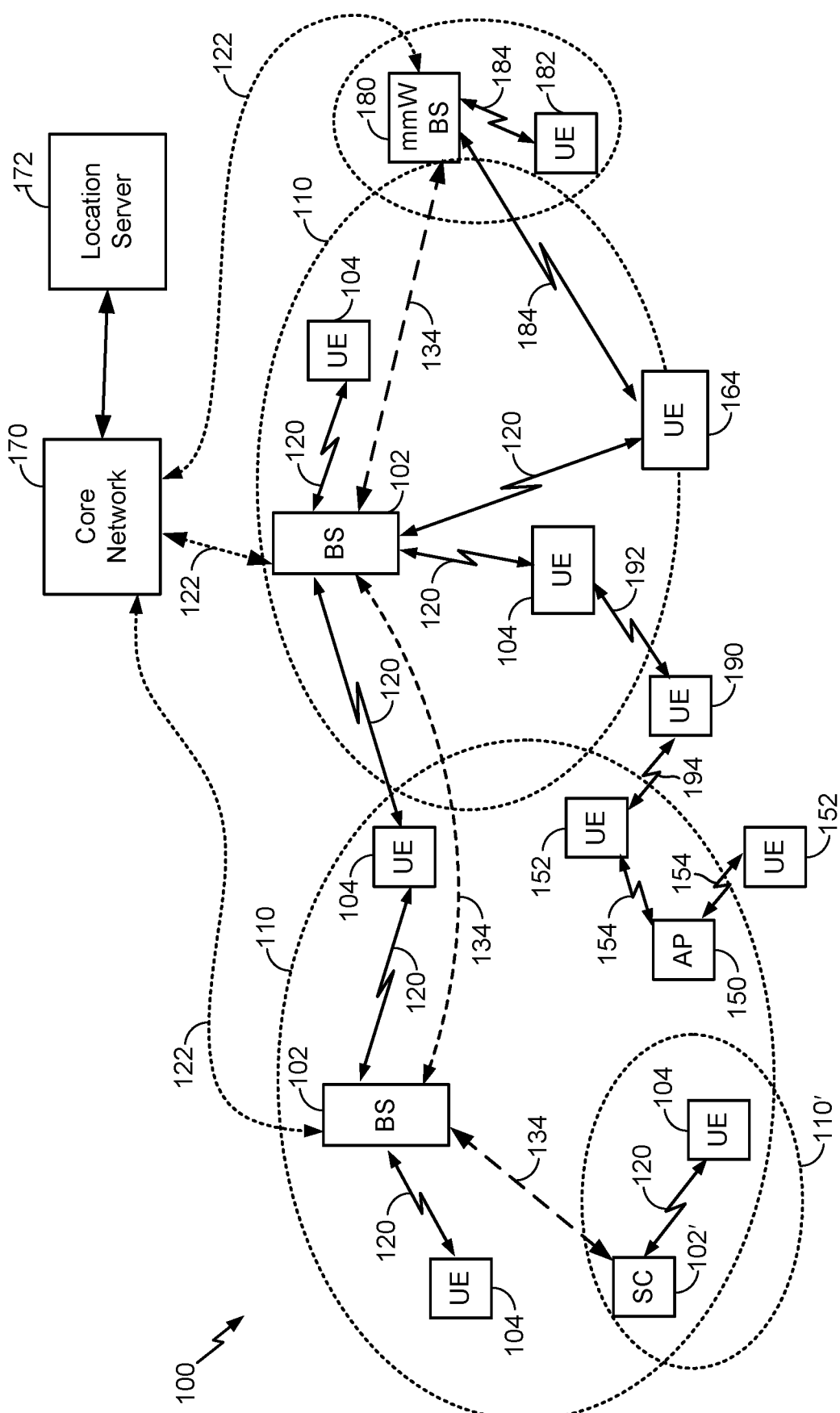
FIG. 1 generally illustrates a wireless environment in accordance with aspects of the disclosure.

Various aspects described herein generally relate to wireless communication systems, and more particularly, to identifying beams of interest for position estimation. These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), an NR Node B (also referred to as a gNB or gNodeB), etc. In addition, in some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID), a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000

MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

Figure 2A:
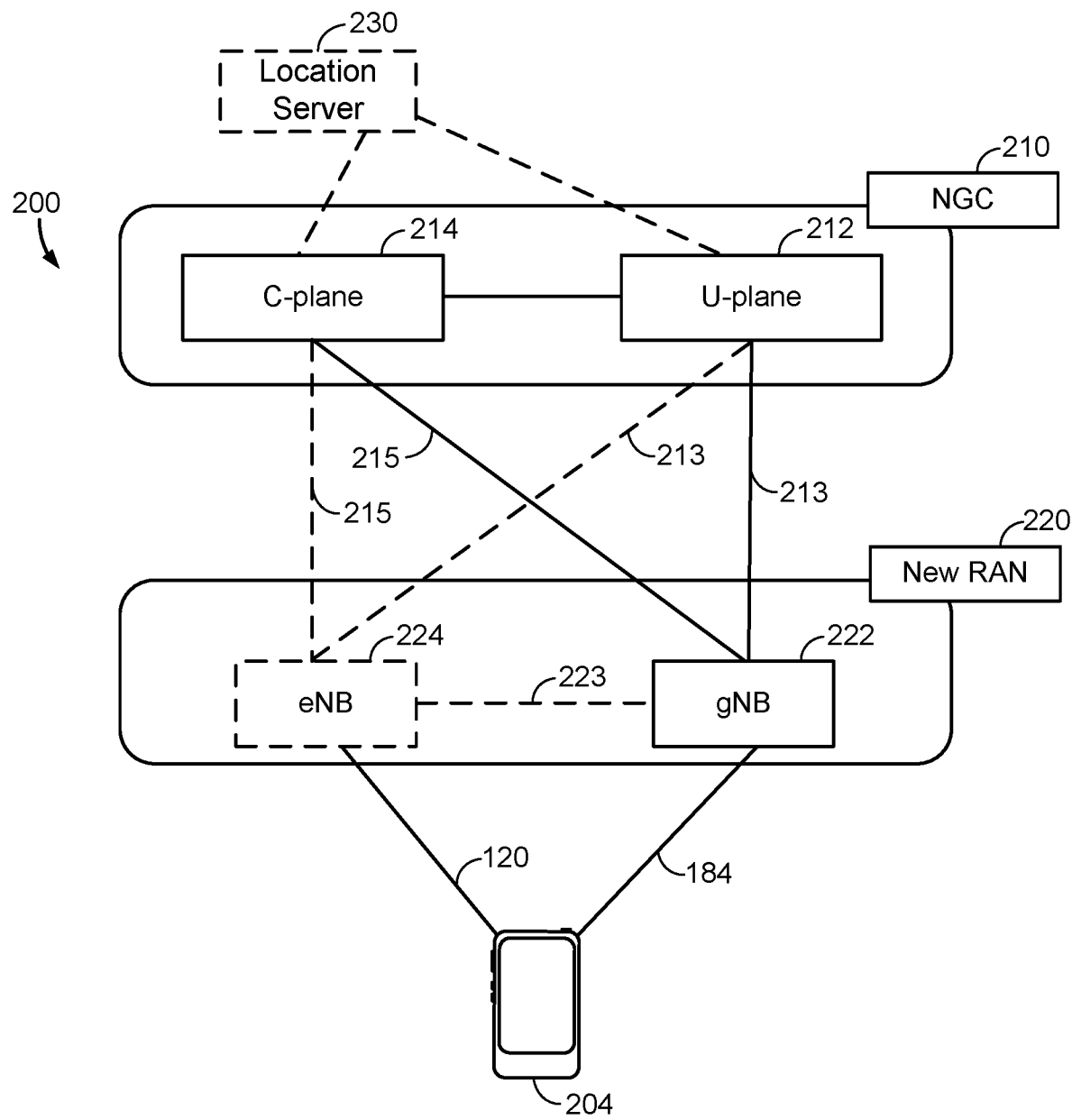
FIG. 2A generally illustrates an example wireless network structure.

According to various aspects, FIG. 2A illustrates an example wireless network structure 200. For example, an NGC 210 (also referred to as a "5GC") can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 219 to the control plane functions 214 and NG-U 217 to user plane functions 212. Further, eNB 224 may directly communicate with gNB 222 via a backhaul connection 223. In some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
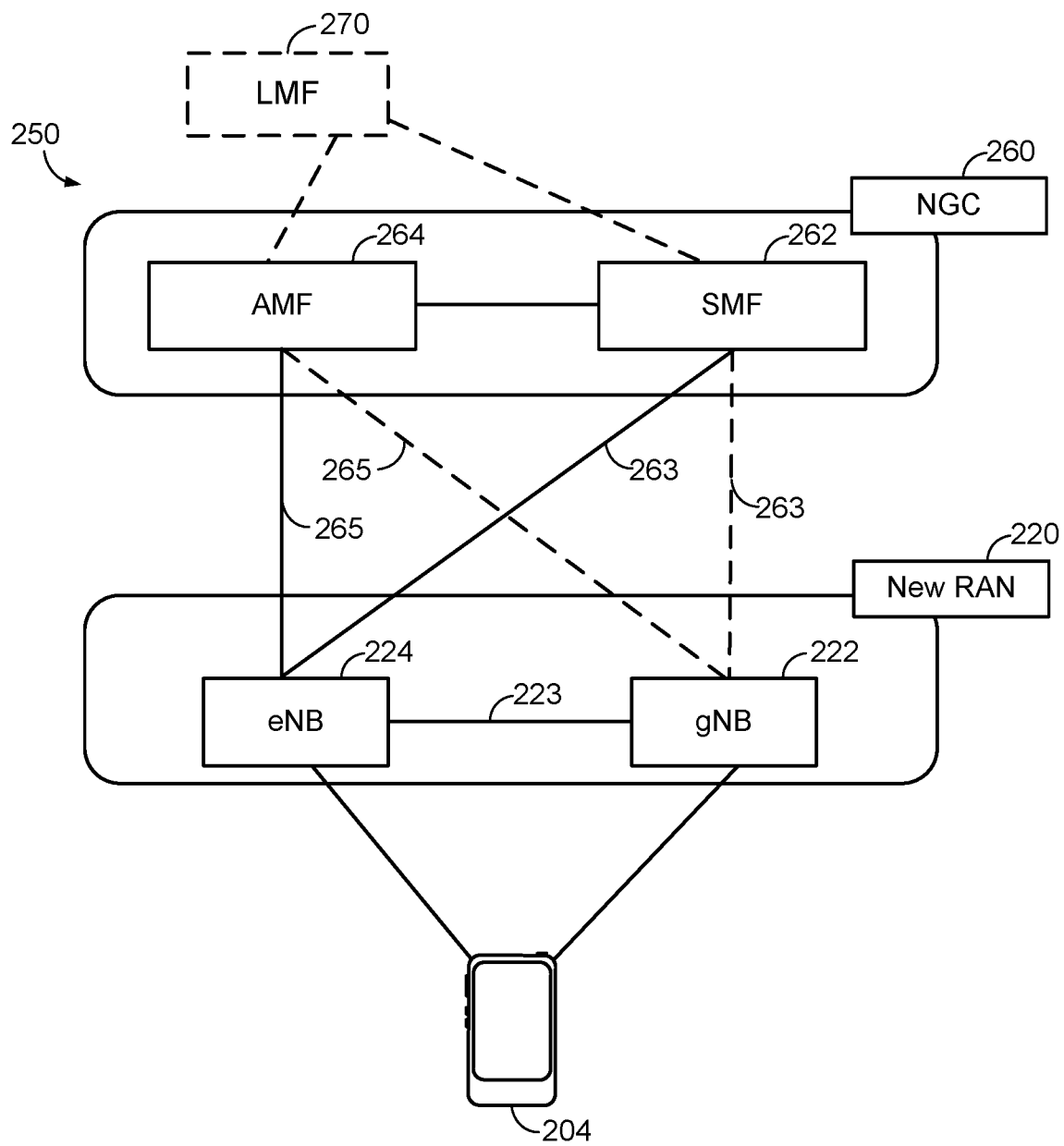
FIG. 2B generally illustrates another example wireless network structure.

According to various aspects, FIG. 2B illustrates another example wireless network structure 250. For example, an NGC 260 (also referred to as a "5GC") can be viewed functionally as control plane functions, provided by an access and mobility management function (AMF)/user plane function (UPF) 264, and user plane functions, provided by a session management function (SMF) 262, which operate cooperatively to form the core network (i.e., NGC 260). User plane interface 267 and control plane interface 269 connect the eNB 224 to the NGC 260 and specifically to SMF 262 and AMF/UPF 264, respectively. In an additional configuration, a gNB 222 may also be connected to the NGC 260 via control plane interface 265 to AMF/UPF 264 and user plane interface 263 to SMF 262. Further, eNB 224 may directly communicate with gNB 222 via the backhaul connection 223, with or without gNB direct connectivity to the NGC 260. In some configurations, the New RAN 220 may only include one or more gNBs 222, while other configurations include one or more of both eNBs 224 and gNBs 222. Either gNB 222 or eNB 224 may communicate with UEs 204 (e.g., any of the UEs depicted in FIG. 1). The base stations of the New RAN 220 communicate with the AMF-side of the AMF/UPF 264 over the N2 interface and the UPF-side of the AMF/UPF 264 over the N3 interface.

The functions of the AMF include registration management, connection management, reachability management, mobility management, lawful interception, transport for session management (SM) messages between the UE 204 and the SMF 262, transparent proxy services for routing SM messages, access authentication and access authorization, transport for short message service (SMS) messages between the UE 204 and the short message service function (SMSF) (not shown), and security anchor functionality (SEAF). The AMF also interacts with the authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF retrieves the security material from the AUSF. The functions of the AMF also include security context management (SCM). The SCM receives a key from the SEAF that it uses to derive access-network specific keys. The functionality of the AMF also includes location services management for regulatory services, transport for location services messages between the UE 204 and the location management function (LMF) 270, as well as between the New RAN 220 and the LMF 270, evolved packet system (EPS) bearer identifier allocation for interworking with the EPS, and UE 204 mobility event notification. In addition, the AMF also supports functionalities for non-3GPP access networks.

Functions of the UPF include acting as an anchor point for intra-/inter-RAT mobility (when applicable), acting as an external protocol data unit (PDU) session point of interconnect to the data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node.

The functions of the SMF 262 include session management, UE Internet protocol (IP) address allocation and management, selection and control of user plane functions, configuration of traffic steering at the UPF to route traffic to the proper destination, control of part of policy enforcement and QoS, and downlink data notification. The interface over which the SMF 262 communicates with the AMF-side of the AMF/UPF 264 is referred to as the N11 interface.

Another optional aspect may include a LMF 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
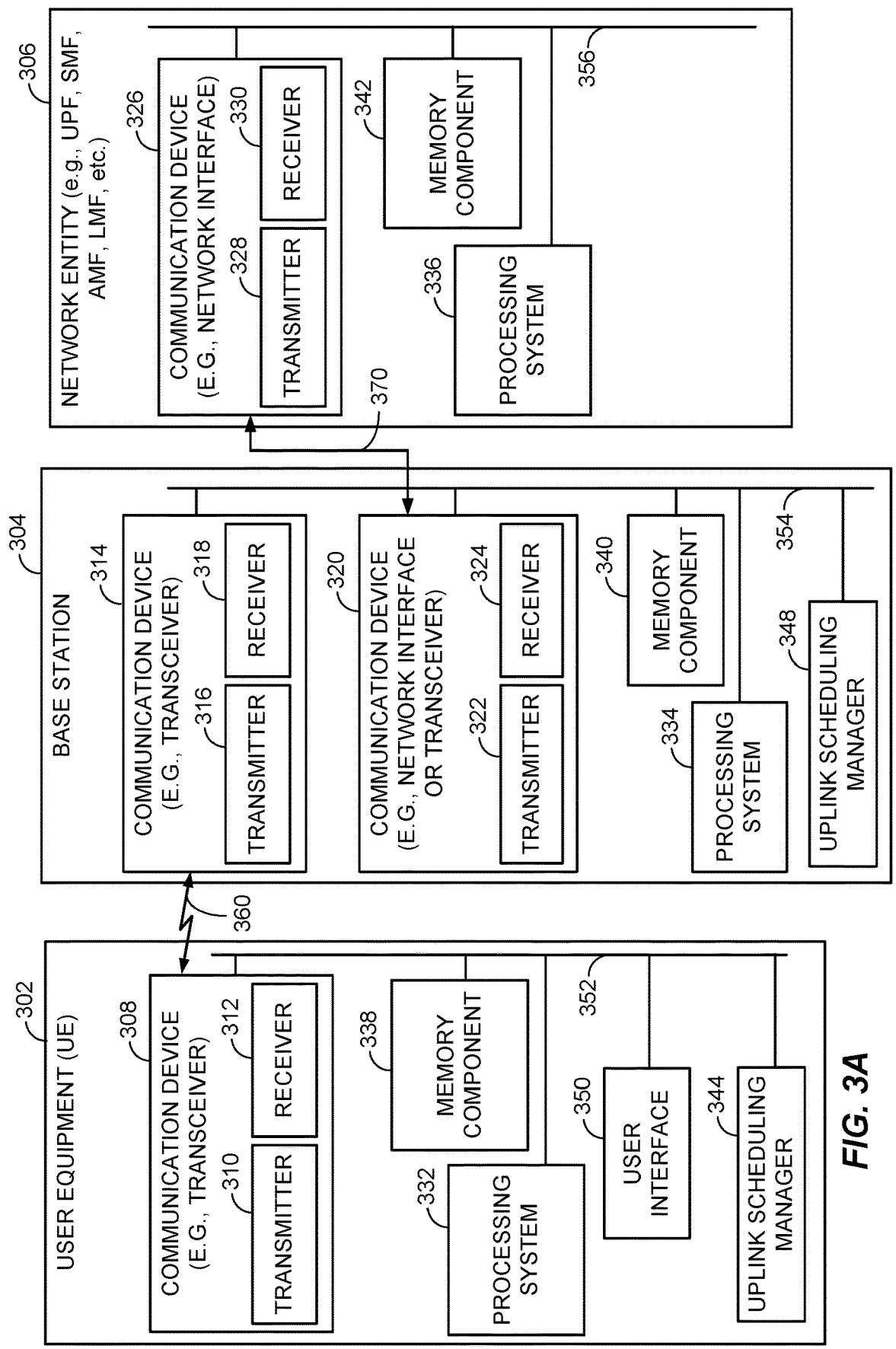
FIG. 3A illustrates exemplary apparatuses in an access network, according to various aspects of the disclosure.

FIG. 3A illustrates several sample components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different RATs.

The UE 302 and the base station 304 each include at least one wireless communication device (represented by the communication devices 308 and 314 (and the communication device 320 if the apparatus 304 is a relay)) for communicating with other nodes via at least one designated RAT. For example, the communication devices 308 and 314 may communicate with each other over a wireless communication link 360, which may correspond to a communication link 120 in FIG. 1. Each communication device 308 includes at least one transmitter (represented by the transmitter 310) for transmitting and encoding signals (e.g., messages, indications, information, and so on) and at least one receiver (represented by the receiver 312) for receiving and decoding signals (e.g., messages, indications, information, pilots, and so on). For example, the communication device 308 may be configured to receive one or more downlink signals transmitted from base station 304 during a downlink period associated with a TDD wireless architecture. The communication device 308 may be further configured to transmit one or more uplink signals to the base station BS during an uplink period associated with the TDD wireless architecture. The downlink signals may be modulated using a downlink carrier wave, and the uplink signals may be modulated using an uplink carrier wave Similarly, each communication device 314 includes at least one transmitter (represented by the transmitter 316) for transmitting signals (e.g., messages, indications, information, pilots, and so on) and at least one receiver (represented by the receiver 318) for receiving signals (e.g., messages, indications, information, and so on). If the base station 304 is a relay station, each communication device 320 may include at least one transmitter (represented by the transmitter 322) for transmitting signals (e.g., messages, indications, information, pilots, and so on) and at least one receiver (represented by the receiver 324) for receiving signals (e.g., messages, indications, information, and so on). For example, the communication device 314 may be configured to receive one or more uplink signals transmitted from, for example, the UE 302 during an uplink period associated with a TDD wireless architecture. The communication device 314 may be further configured to transmit one or more downlink signals to the UE 302 during a downlink period associated with a TDD wireless architecture. The downlink signals may be modulated using a downlink carrier wave, and the uplink signals may be modulated using an uplink carrier wave A transmitter and a receiver may comprise an integrated device (e.g., embodied as a transmitter circuit and a receiver circuit of a single communication device, generally referred to as a "transceiver") in some implementations, may comprise a separate transmitter device and a separate receiver device in some implementations, or may be embodied in other ways in other implementations. A wireless communication device (e.g., one of multiple wireless communication devices) of the base station 304 may also comprise a network listen module (NLM) or the like for performing various measurements.

The network entity 306 (and the base station 304 if it is not a relay station) includes at least one communication device (represented by the communication device 326 and, optionally, 320) for communicating with other nodes. For example, the communication device 326 may comprise a network interface that is configured to communicate with one or more network entities via a wire-based or wireless backhaul 370 (which may correspond to the backhaul link 122 in FIG. 1). In some aspects, the communication device 326 may be implemented as a transceiver configured to support wire-based or wireless signal communication, and the transmitter 328 and receiver 330 may be an integrated unit. This communication may involve, for example, sending and receiving: messages, parameters, or other types of information. Accordingly, in the example of FIG. 3A, the communication device 326 is shown as comprising a transmitter 328 and a receiver 330. Alternatively, the transmitter 328 and receiver 330 may be separate devices within the communication device 326. Similarly, if the base station 304 is not a relay station, the communication device 320 may comprise a network interface that is configured to communicate with one or more network entities 306 via a wire-based or wireless backhaul 370. As with the communication device 326, the communication device 320 is shown as comprising a transmitter 322 and a receiver 324.

The apparatuses 302, 304, and 306 also include other components that may be used in conjunction with the file transmission operations as disclosed herein. The UE 302 includes a processing system 332 for providing functionality relating to, for example, the UE operations as described herein and for providing other processing functionality. The base station 304 includes a processing system 334 for providing functionality relating to, for example, the base station operations described herein and for providing other processing functionality. The network entity 306 includes a processing system 336 for providing functionality relating to, for example, the network function operations described herein and for providing other processing functionality. The apparatuses 302, 304, and 306 include memory components 338, 340, and 342 (e.g., each including a memory device), respectively, for maintaining information (e.g., information indicative of reserved resources, thresholds, parameters, and so on). In addition, the UE 302 includes a user interface 350 for providing indications (e.g., audible and/or visual indications) to a user and/or for receiving user input (e.g., upon user actuation of a sensing device such a keypad, a touch screen, a microphone, and so on). Although not shown, the apparatuses 304 and 306 may also include user interfaces.

Referring to the processing system 334 in more detail, in the downlink, IP packets from the network entity 306 may be provided to the processing system 334. The processing system 334 may implement functionality for an RRC layer, a packet data convergence protocol (PDCP) layer, a radio link control (RLC) layer, and a medium access control (MAC) layer. The processing system 334 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 316 and the receiver 318 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas. The transmitter 316 may modulate an RF carrier with a respective spatial stream for transmission.

At the UE 302, the receiver 312 receives a signal through its respective antenna(s). The receiver 312 recovers information modulated onto an RF carrier and provides the information to the processing system 332. The transmitter 310 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the DL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 310 to select the appropriate coding and modulation schemes, and to facilitate spatial processing. The spatial streams generated by the transmitter 310 may be provided to different antenna(s). The transmitter 310 may modulate an RF carrier with a respective spatial stream for transmission.

The UL transmission is processed at the base station 304 in a manner similar to that described in connection with the receiver function at the UE 302. The receiver 318 receives a signal through its respective antenna(s). The receiver 318 recovers information modulated onto an RF carrier and provides the information to the processing system 334.

In the UL, the processing system 334 provides demultiplexing between transport and logical channels, packet reassembly, deciphering, header decompression, control signal processing to recover IP packets from the UE 302. IP packets from the processing system 334 may be provided to the core network. The processing system 334 is also responsible for error detection.

In an aspect, the apparatuses 302 and 304 may include uplink scheduling managers 344 and 348, respectively. The uplink scheduling managers 344 and 348 may be hardware circuits that are part of or coupled to the processing systems 332 and 334, respectively, that, when executed, cause the apparatuses 302 and 304 to perform the functionality described herein. Alternatively, the uplink scheduling managers 344 and 348 may be memory modules stored in the memory components 338 and 340, respectively, that, when executed by the processing systems 332 and 334, cause the apparatuses 302 and 304 to perform the functionality described herein.

For convenience, the apparatuses 302, 304, and/or 306 are shown in FIG. 3A as including various components that may be configured according to the various examples described herein. It will be appreciated, however, that the illustrated blocks may have different functionality in different designs.

The various components of the apparatuses 302, 304, and 306 may communicate with each other over data buses 352, 354, and 356, respectively. The components of FIG. 3A may be implemented in various ways. In some implementations, the components of FIG. 3A may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 308, 332, 338, 344, and 350 may be implemented by processor and memory component(s) of the UE 302 (e.g., by execution of appropriate code and/or by appropriate configuration of processor components). Similarly, some or all of the functionality represented by blocks 314, 320, 334, 340, and 348 may be implemented by processor and memory component(s) of the base station 304 (e.g., by execution of appropriate code and/or by appropriate configuration of processor components). Also, some or all of the functionality represented by blocks 326, 336, and 342 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE, base station, positioning entity, etc., such as the processing systems 332, 334, 336, the communication devices 308, 314, 326, the uplink scheduling managers 344 and 348, etc.

Figure 3B:
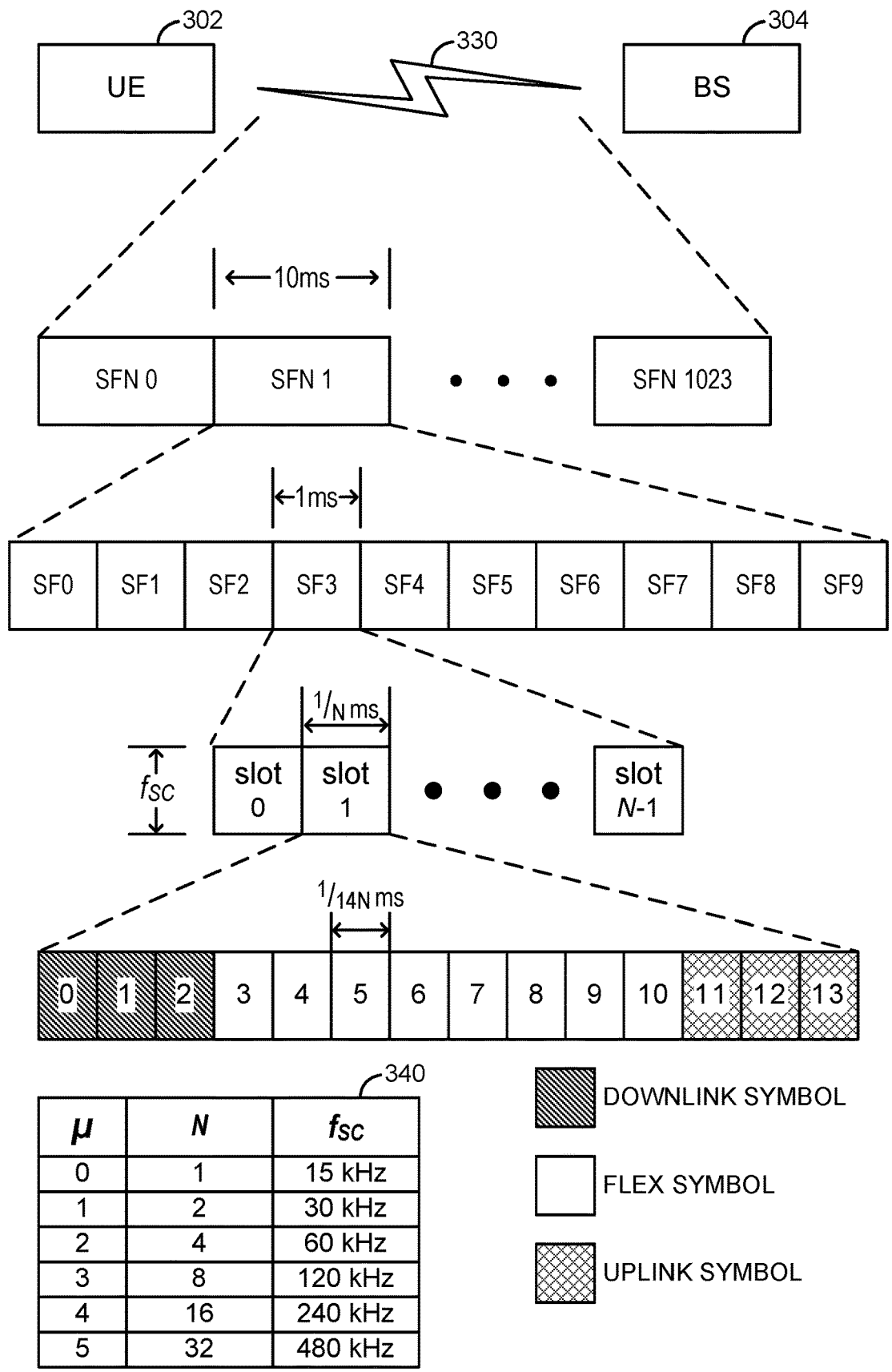
FIG. 3B generally illustrates a time-division duplex (TDD) frame structure that the UE and the base station depicted in FIG. 3A may utilize for wireless communication in accordance with aspects of the disclosure.

FIG. 3B generally illustrates a TDD frame structure 330 that the UE 302 and the base station 304 depicted in FIG. 3A may utilize for wireless communication in accordance with aspects of the disclosure. The TDD frame structure 330 may be, for example, a 5G TDD frame structure.

The TDD frame structure 330 may comprise a series of radio frames that are indexed in accordance with a system frame number (SFN) numerology (SFN N, N+1, N+2, etc.). In the example of FIG. 3B, the TDD frame structure 330 is constituted by one thousand and twenty-four radio frames, each radio frame having a duration of ten milliseconds. Each radio frame may be divided into subframes (SFs), which may also be indexed (e.g., SF0, SF1, etc.). In the example of FIG. 3B, each radio frame in the TDD frame structure 330 is constituted by ten subframes, each subframe having a duration of one millisecond.

Each respective subframe may be further divided into slots. Unlike previous architectures, which specify a fixed number of slots per subframe (for example, two), 5G may have multiple configurations μ, wherein each configuration μ may be associated with a particular number N of slots per subframe. FIG. 3B depicts a configuration chart 340 showing various configurations (μ=0, μ=1, μ=2, etc.) and the specified number of slots per subframe associated with each configuration (N=1, N=2, N=4, etc.). As will be further understood from FIG. 3B, the configuration chart 340 may also specify for each configuration μ a particular subcarrier spacing $f_{SC}$. For example, configuration μ=2 may correspond to N=4 and $f_{SC}$=60 kHz. Although FIG. 3B depicts a subframe that includes four or more slots (numbered 0, 1 . . . N-1), it will be understood that in certain configurations (for example, μ=0 and μ=1) there may be fewer than four slots (for example, one or two).

Different configurations μ may be suitable for different environments. For example, macrocell coverage may use frequencies below 3 GHz. Accordingly, the narrower subcarrier spacing associated with μ=0, μ=1, or μ=2 may be optimal for macrocell coverage. By contrast, μ=3 may be more suitable for small cell coverage implemented on frequencies at or above 3 GHz, μ=4 may be suitable for indoor wideband coverage near frequencies around 5 GHz, and μ=5 may be suitable for mmW coverage at, for example, 28 GHz.

Each slot may be further divided into orthogonal frequency division multiplexing (OFDM) symbol periods. In the example of FIG. 3B, there are fourteen OFDM symbols (or simply "symbols") per slot, regardless of the configuration μ being used. Each symbol may be reserved for uplink, reserved for downlink, or reserved for flexible scheduling (i.e., selectable for scheduling as uplink or downlink, as required). FIG. 3B depicts a particular slot configuration in which the first three symbols are reserved for downlink, the last three symbols are reserved for uplink, and the eight symbols in between are reserved for flexible scheduling. However, it will be understood that there are many possible slot configurations.

The slot configuration depicted in FIG. 3B includes a downlink period of between three and eleven symbol periods and an uplink gap consisting of between three and eleven symbol periods. For example, if all eight of the flex symbol periods are reserved for uplink, the downlink period may consist of three symbol periods and the uplink gap may consist of eleven symbol periods. By contrast, the uplink gap may be as small as three symbol periods.

As noted above, URLLC systems attempt to ensure that latencies are reduced to a duration of one millisecond or less. One proposal for latency reduction is to support data transmissions that have a duration of less than a single slot. For uplink transmissions, a Type B allocation enables data transmissions to start during any symbol period of a particular slot and may have a duration of up to fourteen symbols. Downlink transmissions may also start during any symbol period of a particular slot and may have a duration of two, four, or seven symbols.

In some scenarios, a portion of a slot may be allocated for a particular data transmission, and the remainder of the symbols in the slot may not be sufficient to complete a data transmission. For example, existing standards may prevent a physical uplink shared channel (PUSCH) transmission from crossing a boundary between consecutive slots. As a result, even where the current slot has unused symbol periods remaining, some data transmissions must wait until the next slot in order to utilize the proper code rate.

As will be discussed in greater detail below, an uplink grant provided in a single downlink control information (DCI) transmission may indicate a resource allocation corresponding to multiple repetitions in multiple slots. The uplink grant must indicate which resources have been allocated for the multiple repetitions. For example, a first repetition may be allocated particular timing resources, frequency resources, transport block size, and frequency hopping pattern, and subsequent repetitions may have allocations that are the same or different in accordance with various aspects of the disclosure.

In accordance with aspects of the disclosure, a single DCI transmission may indicate an uplink grant that allocates timing resources for transmitting repetitions of PUSCH data in consecutive/contiguous slots. The uplink grant may use a start and length indicator value (SLIV) to allocate timing resources across consecutive slots. More specifically, a single DCI indicates the allocation of uplink resources for a single HARQ retransmission, and the PUSCH data being retransmitted may be repeatedly transmitted in multiple "nominal" repetitions within the allocated HARQ retransmission period. To indicate the length of the HARQ retransmission period and the number of nominal repetitions permitted within it, the DCI includes a SLIV for a first nominal repetition and the total number of nominal repetitions. The nominal repetitions are contiguous in that each subsequent repetition begins at the first symbol after the last symbol of the previous nominal repetition.

In some implementations of the equation for calculating SLIV, the base station 304 first determines a start symbol ("S") relative to the beginning of a slot and a length ("L") representing a number of symbol periods. In some implementations, if L−1 is less than or equal to 7, then the SLIV is determined to be equal to [(14*(L−1))+S]. On the other hand, if L−1 is greater than 7, then the SLIV is determined to be equal to [(14*(14−L+1))+(14−1−S)]. In these implementations, S+L may be limited to values that are greater than 0 and less than 14. In accordance with aspects of the disclosure, SLIV may be adapted in order to allocate timing resources for multiple repetitions in multiple slots. For example, the base station 304 may select a particular number of repetitions and indicate the particular number in the SLIV, whereupon the UE 302 may transmit a number of repetitions matching the particular number. The present disclosure relates to three different options for allocating timing resources for multiple repetitions in multiple slots using a single DCI transmission. The DCI signal may be transmitted from a base station analogous to the base station 304 depicted in FIG. 3A. A UE analogous to the UE 302 depicted in FIG. 3A may receive the DCI signal from the base station 304 and identify an allocation of timing resources based on a SLIV value included in the DCI signal.

Figure 4A:
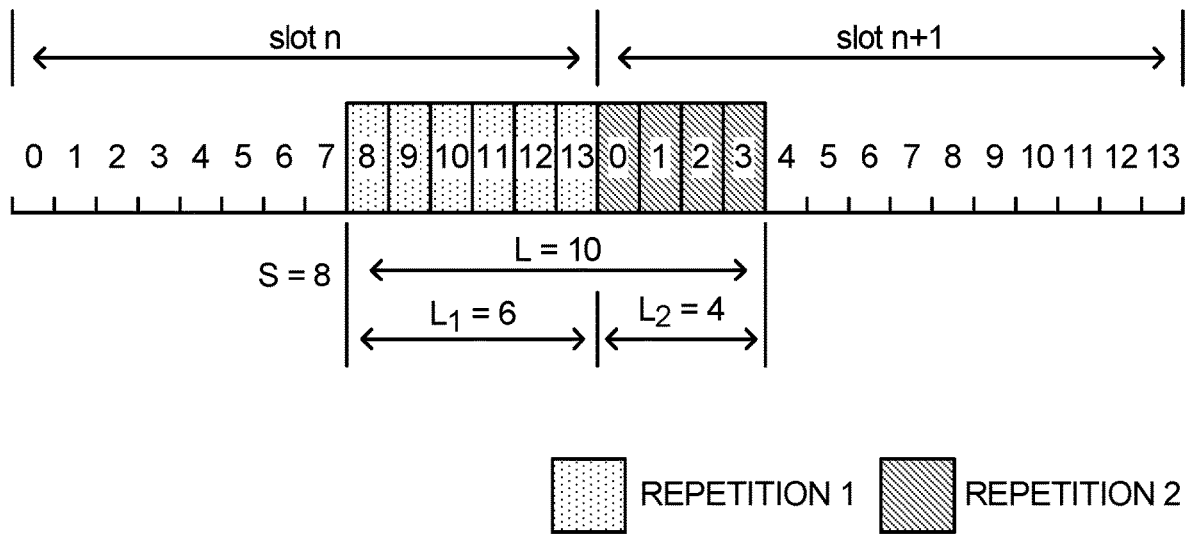
FIG. 4A generally illustrates an option for identifying timing resources for transmitting repetitions in consecutive slots in accordance with aspects of the disclosure.

In a first option for allocating timing resources using SLIV, L may be extended such that S+L may be greater than 14 and L may cross one or more slot boundaries. An example is shown in FIG. 4A. In this example, the base station 304 may allocate 10 symbols (L=10) beginning at symbol period 8 (S=8) of slot n. Accordingly, the base station 304 may calculate a SLIV that is equal to [(14*(14−10+1))+(14−1−8)] =[75]. The calculated SLIV may be provided in a DCI signal and transmitted to the UE 302. The UE 302 may receive the DCI signal from the base station 304 and obtain the SLIV therefrom. The UE 302 may be configured to split the first repetition from the second repetition such that the first repetition is transmitted in slot n using $L_1$ symbols and the second repetition is transmitted in a future slot using $L_2$=L-$L_1$ symbols. The $L_1$ symbols in slot n may include all remaining uplink symbols available in slot n, which is equal to $L_1$=6 in the present example. The second repetition is allocated $L_2$=10−6=4 symbol periods in some future slot. In particular, the second repetition may be allocated to the second slot that includes $L_2$ consecutive symbol periods. In the example of FIG. 4A, the second repetition is transmitted using the first four uplink symbol periods of slot n+1.

Figure 4B:
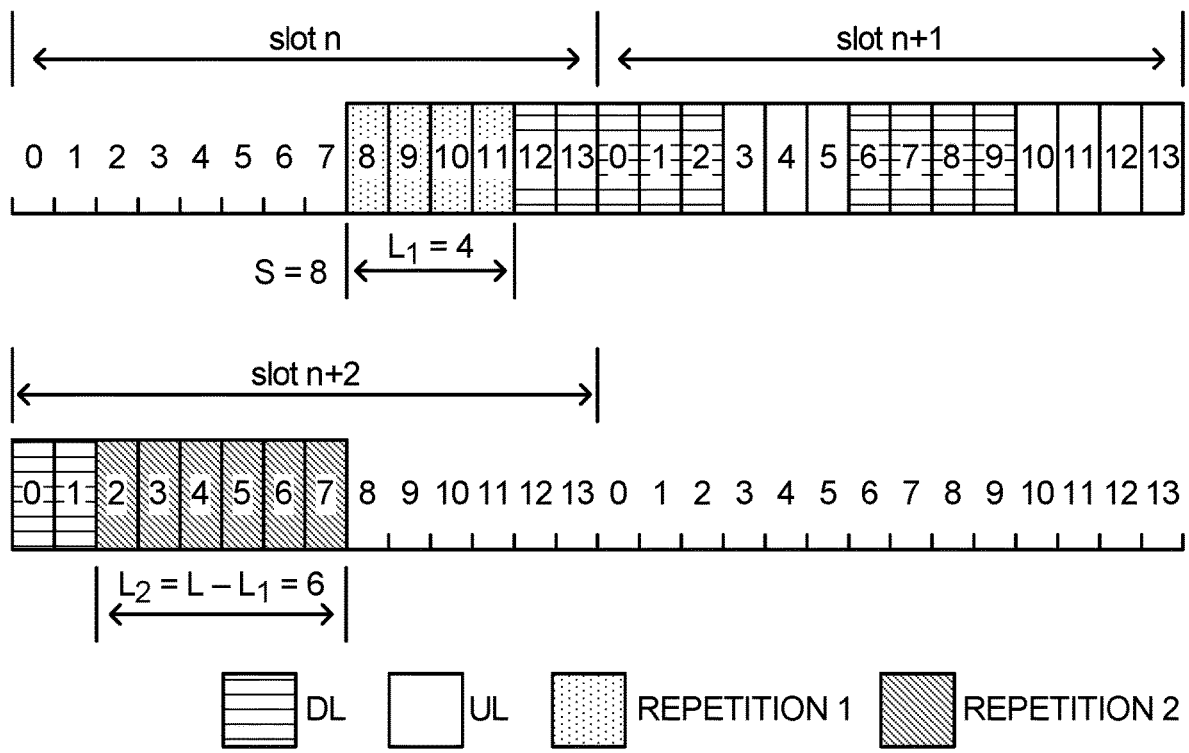
FIG. 4B generally illustrates another option for identifying timing resources for transmitting repetitions in consecutive slots in accordance with aspects of the disclosure.

Another example of the first option is shown in FIG. 4B. In this example, the base station 304 may (again) allocate 10 symbols (L=10) beginning at symbol period 8 (S=8) of slot n. However, in this example, only 4 symbol periods are available in slot n, because symbol periods 12-13 of slot n are designated for downlink. Accordingly, $L_1$=4 and $L_2$=10−4=6. Given that $L_2$ is equal to 6, the UE 302 may wait for an opportunity to perform an uplink transmission on 6 consecutive uplink signals. With respect to slot n+1, symbol periods 0-2 and 6-9 are designated for downlink. Symbol periods 3-5 and 10-13 are designated for uplink, but transmission of the second repetition requires six consecutive uplink symbols, so transmission is delayed. In this particular example, the UE 302 must wait until slot n+2 in order to find 6 consecutive symbol periods designated for uplink (i.e., symbol periods 2-7 of slot n+2).

Figure 4C:
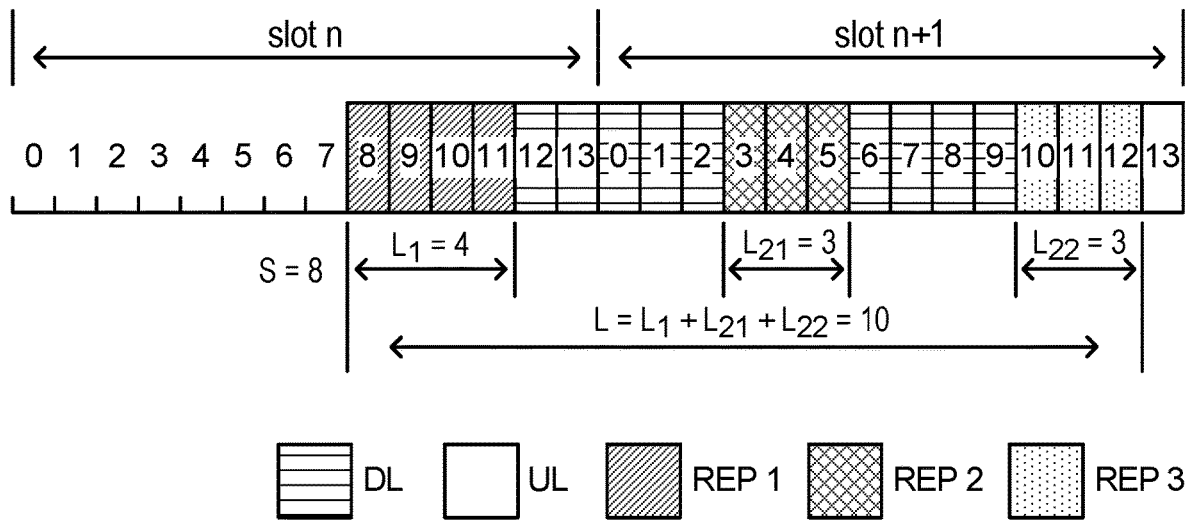
FIG. 4C generally illustrates another option for identifying timing resources for transmitting repetitions in consecutive slots in accordance with aspects of the disclosure.

Another example of the first option is shown in FIG. 4C. In this example (as in the previous example), the base station 304 may allocate 10 symbols (L=10) beginning at symbol period 8 (S=8) of slot n. Moreover, in this example (as in the previous example), only 4 symbol periods are available in slot n. Accordingly, $L_1$=4 and $L_2$=6. However, the UE 302 may be configured to split $L_2$ such that $L_2$=$L_{21}$+$L_{22}$. Because slot n+1 includes a block of three consecutive uplink symbol periods (symbol periods 3-5), the symbol periods may be used to transmit a second repetition (such that $L_{21}$=3). As a result, the UE 302 determines that $L_{22}$=$L_2$−$L_{21}$=3 and finds the first available block of three consecutive uplink symbol periods (symbol periods 10-12 of slot n+1). The UE 302 then uses these symbol periods to transmit a third repetition. Relative to the example of FIG. 4B, the $L_2$ splitting technique shown in FIG. 4C results three total repetitions (rather than two), wherein all of the repetitions are completed in a shorter amount of time. However, it will also be understood that the coding rate of the second and third repetitions depicted in FIG. 4C may be double the code rate of the second repetition depicted in FIG. 4B.

In yet another example of the first option, the determination as to whether to split the remaining symbols (as shown in FIG. 4C, where $L_2$ is split into $L_{21}$ and $L_{22}$) or keep the remaining symbols together (as shown in FIGS. 4A-4B, where $L_2$ includes a block of consecutive uplink symbol periods) may be based on an indicator. The indicator may be explicitly provided by the base station 304 using, for example, the DCI signal. Additionally or alternatively, the indicator may be implicitly provided based on a code rate and/or a number of symbols in that repetition.

Figure 4D:
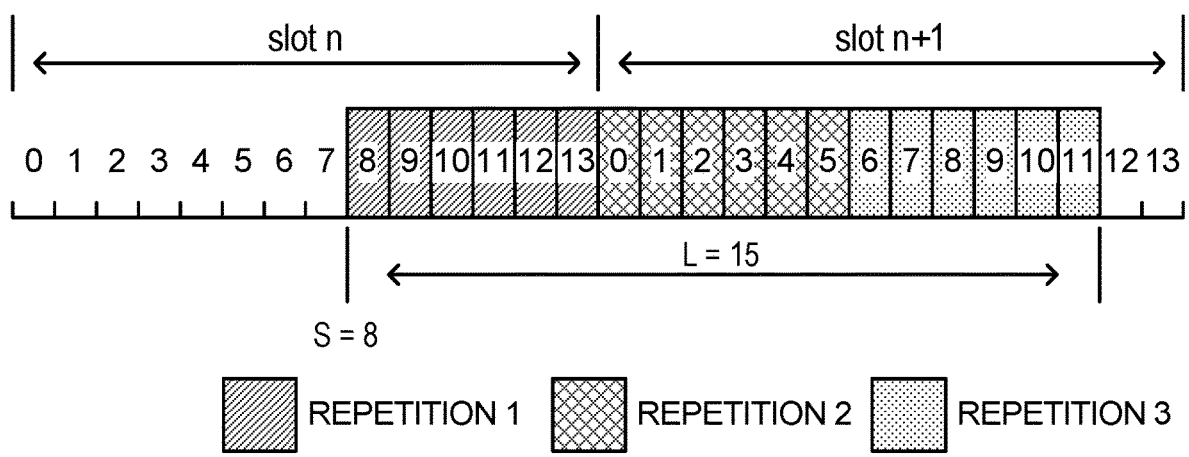
FIG. 4D generally illustrates another option for identifying timing resources for transmitting repetitions in consecutive slots in accordance with aspects of the disclosure.

In a second option for allocating timing resources using SLIV, if S+L is determined to be greater than 14, this indicates that a first repetition of a PUSCH signal may begin at symbol period S and extend to the last uplink symbol period of the slot, and further indicates that one or more subsequent repetitions should have equal length to the first repetition. Moreover, the values of S and L may indicate a number of repetitions to be transmitted. An example is shown in FIG. 4D. In this example, the base station 304 may allocate 15 symbols beginning at symbol period 8 of slot n. Accordingly, the base station 304 may provide a SLIV to the UE 302, and the UE 302 may be configured to determine that S=8 and L=15. The UE 302 may be configured to determine a number of repetitions to be transmitted based on these values. In particular, the UE 302 may determine that the number of repetitions is equal to [ceiling((14-S)/L)]. In this example, the number of repetitions would be equal to [ceiling(6/15)]=3. As a result, the UE 302 would transmit three repetitions of 6 symbol periods each. It will be understood that if the base station 304 had selected L as being 18 rather than 15, the UE 302 would have performed the same transmissions. It will be further understood that if the base station 304 had selected L as being 12 rather than 15, the UE 302 would have performed only two repetitions.

In a third option for allocating timing resources using SLIV, L may be limited to values that are greater than zero and less than (14-S). However, the values of S and L derived from the SLIV may be configured to apply only to the first repetition. For following repetitions, the UE 302 may be configured to use the first available uplink symbol to begin the repetition, and the repetition may have the same length L as the first repetition. In this case, the number of repetitions may be indicated using an explicit indicator contained in the DCI signal, or using an implicit indicator, for example, wherein the UE repeats until the effective code rate reaches a code rate specified during RRC.

In the previous options (for example, the first option and the second option), the SLIV may be set in a different manner than practiced previously. In particular, if L-1 is less than or equal to 7, then the SLIV is determined to be equal to [(14*(L-1))+S]. If L-1 is greater than 7 but less than 14, then the SLIV is determined to be equal to [(14*(14-L+1))+ (14-1-S)]. If L-1 is greater than or equal to 14, then the SLIV is determined to be equal to [A*(L-1)+S], where A may be set to 9, 11, or 13. In these implementations, L would not be limited to values that are greater than zero and less than (14-S).

In another option in which S+L is determined to be greater than 14, the SLIV may be calculated as 14×(L−1+X) (S+1)−Y, where X is greater than or equal to 7 and Y is greater than or equal to 7. For example, X and Y may both be 7. As another example, X may be 7 and Y may be 5*7+4=39. The values of X and Y may be specified in the applicable standard. Note that this equation will result in new numbers that are unique and different from SLIV numbers as conventionally calculated. In addition, a benefit of this equation is that it is the only equation the UE needs to calculate if S+L is determined to be greater than 14.

The additional valid combinations of S and L may be stored in various ways. As a first option, the existing SLIV table can be extended. Currently, a SLIV is indicated in 7 bits. To accommodate the additional combinations of S and L, additional bits can be added to the 7-bit SLIV field. However, this introduces additional overhead. As a second option, the current SLIV table has 128 entries, but only 105 entries are used, meaning 23 entries are not used. The present disclosure proposes to use these 23 entries to store the additional valid combinations of S and L. Example combinations of S and L are shown in Table 1. As will be appreciated, other combinations of S and L may also be valid.

TABLE 1

| S | L |
|---|---|
| 4 | 14 |
| 5 | 14 |
| 6 | 11, 14 |
| 7 | 10, 12 |
| 8 | 10, 14 |
| 9 | 8, 11, 14 |
| 10 | 7, 9, 11, 14 |
| 11 | 7, 9, 10, 11, 14 |
| 12 | 5, 6, 7 |

Alternatively or additionally, when using the disclosed SLIV equation for when S+L is determined to be greater than 14 (i.e., 14×(L−1+X)+(S+1)−Y), a UE may consider SLIVs that are not larger than 128 as valid SLIV values/configurations. For example, even if there exists a pair of S and L values that makes the new SLIV equation equal to 129 (i.e., greater than 128), the UE will consider such pair of S and L as non-valid, since the value of 129 cannot be represented by 7 bits (i.e., 129 is greater than $2^7$).

In the event that the UE receives a SLIV that can be mapped to both a previous equation for calculating the SLIV and a new equation, such as the disclosed equation when S+L is determined to be greater than 14 (i.e., 14×(L−1+X)+ (S+1)−Y), the UE can assume that the SLIV represents a previous (S, L) combination, rather than a new (S, L) combination, such as an (S, L) combination in Table 1. The UE may therefore use the previous equation to derive the values of S and L. This permits, among other things, backwards compatibility for UEs that cannot calculate the (S, L) combination using the disclosed equation.

In accordance with aspects of the disclosure, a single DCI transmission may include an uplink grant that allocates frequency resources for transmitting repetitions of PUSCH data in consecutive slots. The present disclosure relates to four different options for allocating frequency resources for multiple repetitions in multiple slots using a single DCI transmission.

In a first option for allocating frequency resources, the same frequency allocation that applies to the first repetition may apply to all subsequent repetitions. In a second option for allocating frequency resources, the UE 302 may assume an error in the event that a number of PUSCH symbols in a next repetition is less than that of the first repetition.

Figure 5:
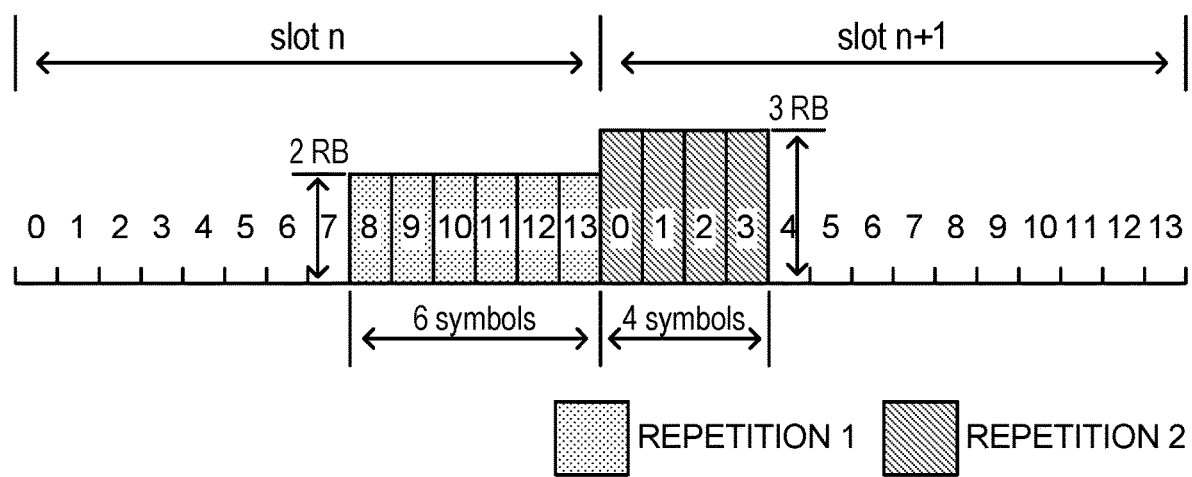
FIG. 5 generally illustrates an option for identifying frequency resources for transmitting repetitions in consecutive slots in accordance with aspects of the disclosure.

In a third option for allocating frequency resources, the DCI may indicate frequency resources for the repetition with the largest number of symbols. For subsequent repetitions, a matching number of resources may be allocated. In particular, repetitions with a smaller allocation of timing resources (fewer symbol periods) may receive a greater allocation of frequency resources, such that the number of resource blocks (RBs) is the same for each repetition. For example, as shown in FIG. 5, if a first repetition (in slot n) is allocated 2 RBs spanning 6 symbol periods for a total of 12 RBs, then a subsequent repetition may also be allocated 12 resource blocks. If the timing allocation indicates that the second repetition includes fewer symbol periods (for example, 4 symbol periods in slot n+1), then the frequency allocation may be increased to make up the difference in resource allocation. In particular, to arrive at a total of 12 RBs, the second repetition may be allocated 3 RBs spanning the 4 symbol periods.

As shown in FIG. 5, the additional RBs may be added by expanding the allocation upward (i.e., by adding higher frequencies). However, it will be understood that the additional RBs may be added by expanding the allocation downward instead (i.e., by adding lower frequencies). The determination as to whether to expand upward or downward may be based on distance from a bandwidth part (BWP). If there are more frequencies between the allocated frequencies and the upper edge of the BWP than there are between the allocated frequencies and the lower edge of the BWP, then the expansion may be upward (i.e., the direction with the most frequencies).

In some scenarios, it may not be possible to allocate additional RBs for a particular symbol period because an edge of a BWP is reached. If the edge of the BWP is reached, the UE 302 may assume that the DCI was received with errors. Additionally or alternatively, the UE 302 may wrap around the edge of the BWP until the repetition has sufficient resources. The wrapping may be performed by, for example, adding the RBs nearest the lower edge of the BWP to the allocation in response to a determination that the RBs nearest the upper edge of the BWP have all been allocated.

In a fourth option for allocating frequency resources accordance with other aspects of the disclosure, the DCI may indicate frequency resources for the repetition with the largest number of symbols (as in the previous example), and a matching number of resources may be allocated to subsequent repetitions in terms of resource elements (REs). If RBs have different numbers of usable data REs, then repetitions that are allocated fewer usable REs (in the same number of RBs) may struggle to transmit the repetition. Accordingly, in case of different repetitions having different numbers of usable REs for PUSCH (for example, due to different demodulation reference signal (DMRS) overhead), the UE 302 may perform a sub-RB transmission and ensure that each repetition is given the same number of usable REs.

In accordance with aspects of the disclosure, a single DCI transmission may include an uplink grant that indicates a transport block size (TBS) for transmitting repetitions on the PUSCH. The present disclosure relates to three different options for indicating the TBS.

In a first option for indicating the TBS, the repetition associated with the least number of RBs and/or REs is identified and the TBS is determined based on the TBS of that repetition. As a result, other repetitions may have coding rates that are less than or equal to that of the repetition associated with the least number of RBs and/or REs. In this option, all repetitions may be self-decodable.

In a second option for indicating the TBS, the repetition associated with the greatest number of RBs and/or REs is identified and TBS is determined based on the TBS of that repetition. As a result, other repetitions may have coding rates that are greater than or equal to that of the repetition associated with the greatest number of RBs and/or REs. In this option, some repetitions may not be self-decodable.

In a third option for indicating the TBS, the TBS may be determined based on the first actual repetition. As a result, other repetitions may have a higher or lower coding rate than that of the first actual repetition. Note that an "actual repetition" is a segment of a nominal repetition that is actually transmitted by the UE, such as the repetitions of length "$L_1$" and "$L_2$" illustrated in FIG. 4A. A "nominal repetition" is the repetition for which the UE receives an uplink grant, such as the repetition of length "L" illustrated in FIG. 4A.

In a fourth option for indicating the TBS, the TBS may be determined based on the first nominal repetition. As a result, other repetitions may have a higher or lower coding rate than that of the first repetition. If the nominal repetition crosses the slot border (as illustrated in FIG. 4A), then as a first option, DMRS overhead (i.e., the symbols during which DMRS are scheduled) is based on the nominal first repetition, without considering possible segmentations (e.g., repetitions 0 and 1 of lengths $L_1$ and $L_2$, respectively, in FIG. 4A) within the nominal repetition. More specifically, the scheduling of a nominal repetition accounts for only the number of DMRS scheduled within the nominal length of scheduling without any segmentation within the nominal PUSCH transmission. In this option, the number of DMRS symbols for TBS determination is obtained by assuming the continuous uplink transmission with nominal length L. Note that a nominal repetition may not be segmented into multiple actual repetitions, and may therefore be commensurate with the actual repetition. That is, if the nominal repetition is not segmented into multiple actual repetitions, it is itself the actual repetition. However, a nominal repetition can also be, as illustrated in FIG. 4A, segmented into two or more actual repetitions.

As a second option, the DMRS overhead and/or any symbols (e.g., downlink symbols) that are unusable for uplink transmission are accounted for based on the actual repetitions (e.g., repetitions 0 and 1 of lengths $L_1$ and $L_2$, respectively, in FIG. 4A) within the first nominal repetition (e.g., the repetition of length L in FIG. 4A). That is, only the symbols that are actually usable for the actual repetitions are considered in determining the TBS.

In accordance with aspects of the disclosure, a single DCI transmission may include an uplink grant that defines a frequency hopping pattern for transmission of repetitions on the PUSCH. The present disclosure relates to two different options for defining the TBS.

Figure 6A:
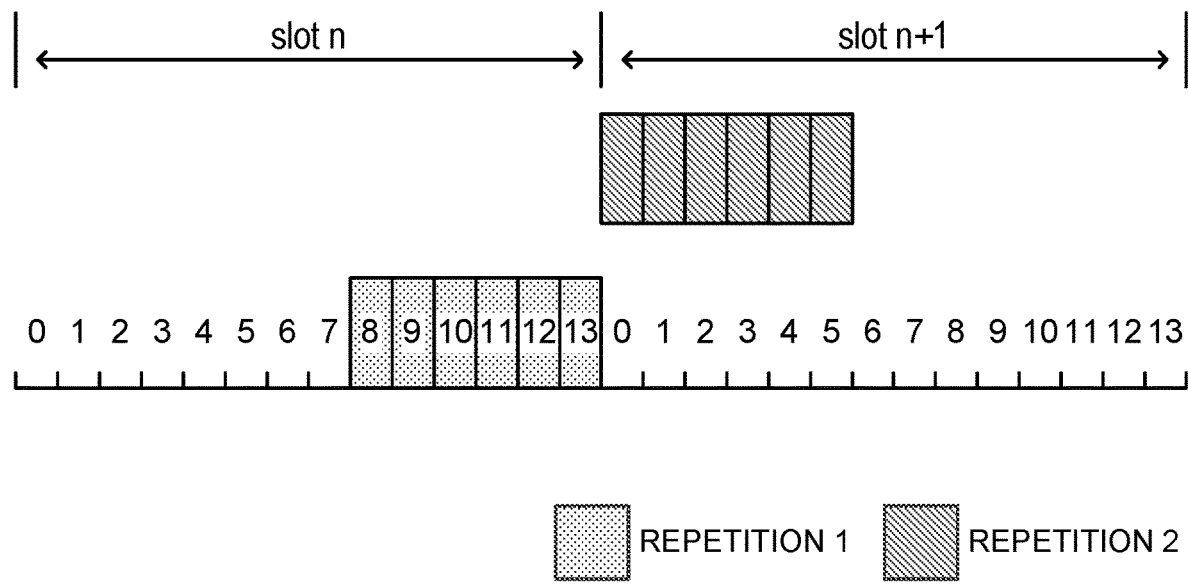
FIG. 6A generally illustrates an option for identifying a frequency hopping pattern in accordance with aspects of the disclosure.

In a first option for defining a frequency hopping pattern, inter-slot frequency hopping is performed. An example is shown in FIG. 6A. In FIG. 6A, the first repetition is transmitted in slot n at the first frequency in the frequency hopping pattern. Then, the second repetition is transmitted in slot n+1 at the second frequency in the frequency hopping pattern.

Figure 6B:
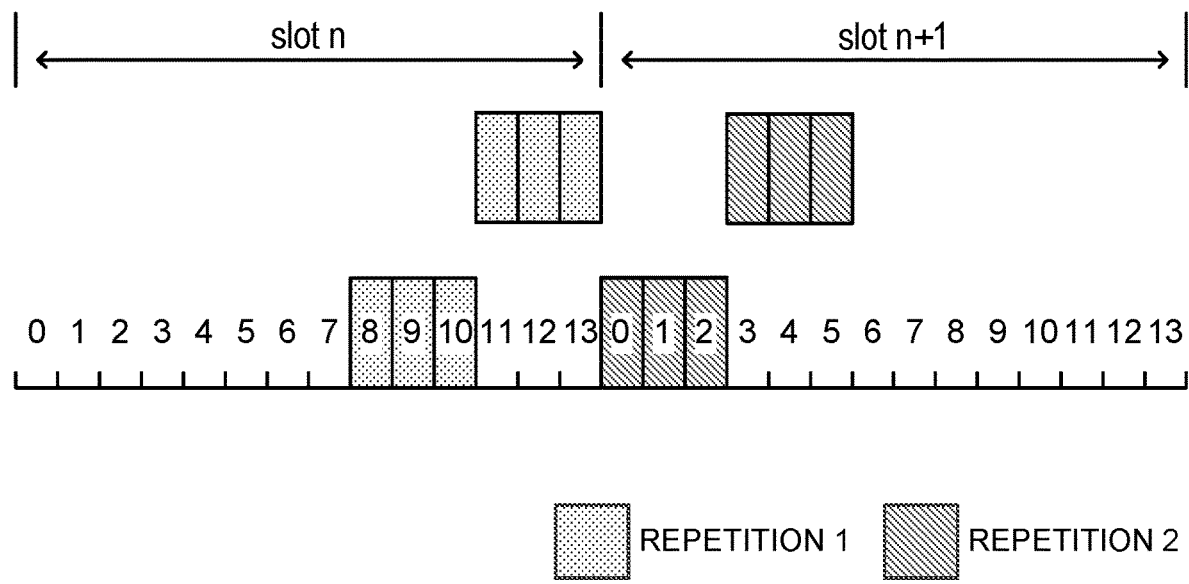
FIG. 6B generally illustrates another option for identifying a frequency hopping pattern in accordance with aspects of the disclosure.

In a second option for defining a frequency hopping pattern, intra-slot frequency hopping is performed. An example is shown in FIG. 6B. in FIG. 6B, a first portion of the first repetition is transmitted in slot n at the first frequency in the frequency hopping pattern and a second portion of the first repetition is transmitted at the second frequency in the frequency hopping pattern. Then, a first portion of the second repetition is transmitted in slot n+1 at the first frequency in the frequency hopping pattern and a second portion of the second repetition is transmitted at the second frequency in the frequency hopping pattern.

In accordance with aspects of the disclosure, DMRS considerations are taken into account. For example, PUSCH mapping Type B may be applied to all repetitions. Additionally or alternatively, each repetition may be configured independently based on the length of the actual repetition in the time domain. Additionally or alternatively, the UE 302 may be configured with multiple DMRS locations. The DMRS locations may be determined as a function of the start symbol and/or length of each actual repetition.

The base station 304 may signal which of the DMRS locations is to be used by providing an explicit indicator in the DCI signal. Additionally or alternatively, the DMRS location may be signaled implicitly as a function of a number of ports and/or the pattern used for the first PUSCH. The scrambling ID may be the same for each repetition, or may instead be selected dynamically.

In accordance with aspects of the disclosure, uplink control information (UCI) is taken into account. In a first option, UCI may be multiplexed to all repetitions. In a second option, multiplexing may only be applied to one PUSCH repetition based on, for example, a timeline or a number of symbol periods. For example, if the number of symbols in a PUSCH repetition exceeds a threshold, then the UCI may be multiplexed. In a third option, UCI is dropped.

In accordance with aspects of the disclosure, the timing of an SRS is taken into account. SRS transmission may start in any of the last six symbols of an SRS slot offset and may have a duration of one, two, or four symbols. Moreover, the UE 302 may be configured to transmit the SRS using an aperiodic SRS resource, which may be triggered by the same DCI that grants one or more PUSCH repetitions. The present disclosure relates to two different options for determining how to reconcile one or more PUSCH repetitions with an SRS transmission.

It will be understood that when PUSCH and SRS are transmitted in a same slot, the UE 302 may only be configured to transmit SRS after the transmission of each repetition of the PUSCH and the corresponding DMRS. Prioritization rules may define the outcome when there is a collision of SRS with a short physical uplink control channel (PUCCH) transmission. In the event that SRS is dropped, dropping can be partial in the time domain, i.e., only those OFDM symbols that collide with the short PUCCH may be dropped.

Figure 7A:
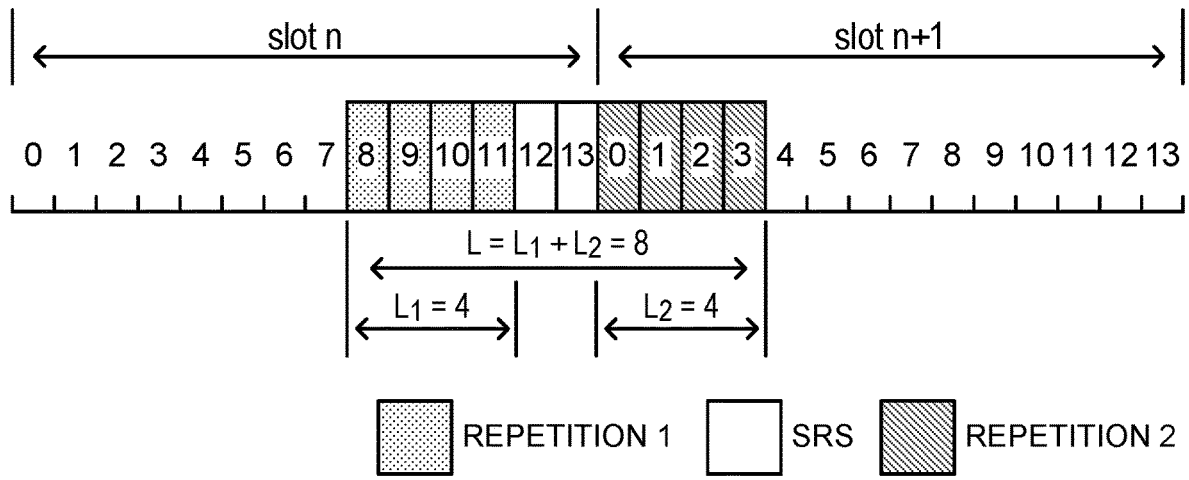
FIG. 7A generally illustrates an option for reconciling a sounding reference signal (SRS) transmission in accordance with aspects of the disclosure.

In a first option for reconciling one or more PUSCH repetitions with SRS transmission, the length value indicated by the SLIV may indicate a total number of symbol periods for transmitting one or more repetitions, wherein the indicated symbol periods may be non-consecutive. As will be understood from FIG. 7A, for example, there may be an SRS transmission that is scheduled for symbol periods 12-13 of slot n. In this example, the SLIV may indicate that S=8 and L=8. In the absence of the SRS transmission, the first repetition would be transmitted in symbol periods 8-13 of slot n and the second repetition would be transmitted in symbol periods 0-1 of slot n+1. However, due to the scheduling of the SRS transmission for symbol periods 12-13, the repetitions may be scheduled for non-consecutive symbol periods, i.e., symbol periods 8-11 of slot n (for the first repetition) and symbol periods 0-3 of slot n+1 (for the second repetition). Accordingly, the total length L indicated by the SLIV may be split into non-consecutive lengths $L_1$ and $L_2$ for transmitting the first repetition and second repetition, respectively. The SRS may be transmitted between the repetitions, as shown in FIG. 7A.

Figure 7B:
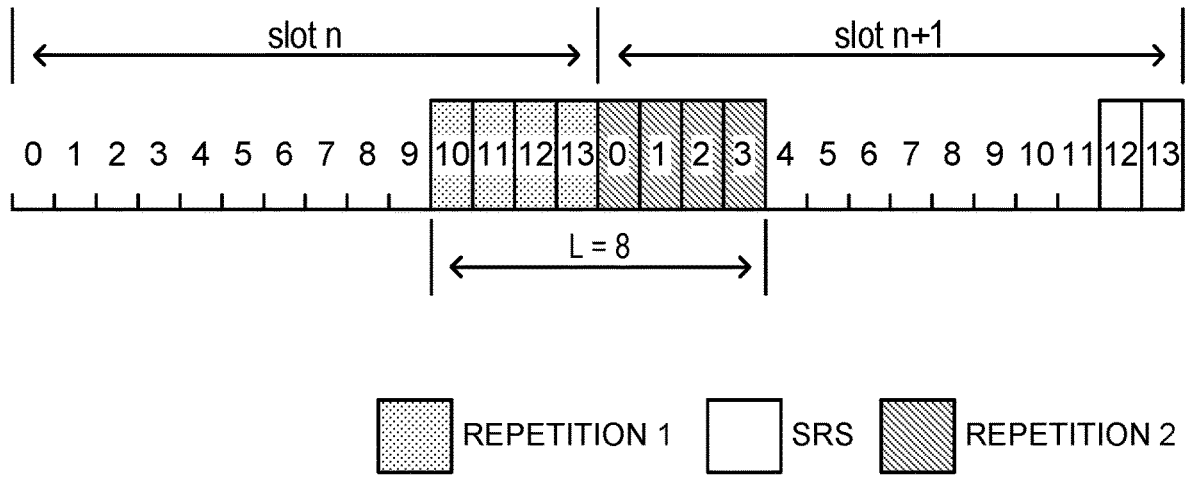
FIG. 7B generally illustrates another option for reconciling an SRS transmission in accordance with aspects of the disclosure.

In a second option for reconciling one or more PUSCH repetitions with SRS transmission, the UE 302 may be configured to move the SRS transmission in accordance with a slot offset parameter. As will be understood from FIG. 7B, for example, the SRS transmission may be moved to the first uplink opportunity after each repetition in the PUSCH transmission is complete. In FIG. 7B, the first repetition and second repetition are completed at the end of slot n and the beginning of slot n+1, respectively. Then the SRS transmission is performed during symbol periods 12-13 of slot n+1, after transmission of each repetition has been completed.

In accordance with aspects of the disclosure, the timing of a periodic or semi-persistent SRS is also taken into account. The present disclosure relates to two different options for determining how to reconcile one or more PUSCH repetitions with a periodic or semi-persistent SRS transmission. In a first option for reconciling one or more PUSCH repetitions with a periodic or semi-persistent SRS transmission, the SRS transmission may be canceled. In a second option for reconciling one or more PUSCH repetitions with a periodic or semi-persistent SRS transmission, the SRS transmission may be postponed to the next available uplink opportunity after transmission of each repetition has been completed.

In accordance with aspects of the disclosure, uplink power control is also taken into account. For a grant-based PUSCH transmission at slot i, the UE 302 may determine transmission power as specified in 3GPP technical specification (TS) 38.213, section 7.1.1. When performing repetition across slots in accordance with aspects of the disclosure, the same set of power control parameters determined for the first repetition (for example, $\rho_0$, $\alpha$) may be applied to all subsequent repetitions. If a later repetition does not have the same number of RBs as the first repetition $M_{RB}^{PUSCH}(i)$, then the bandwidth for the later repetition may be scaled accordingly.

In some implementations, each actual repetition may have the same redundancy version. In other implementations, the redundancy versions of each actual repetition may be selected dynamically.

Figure 8:
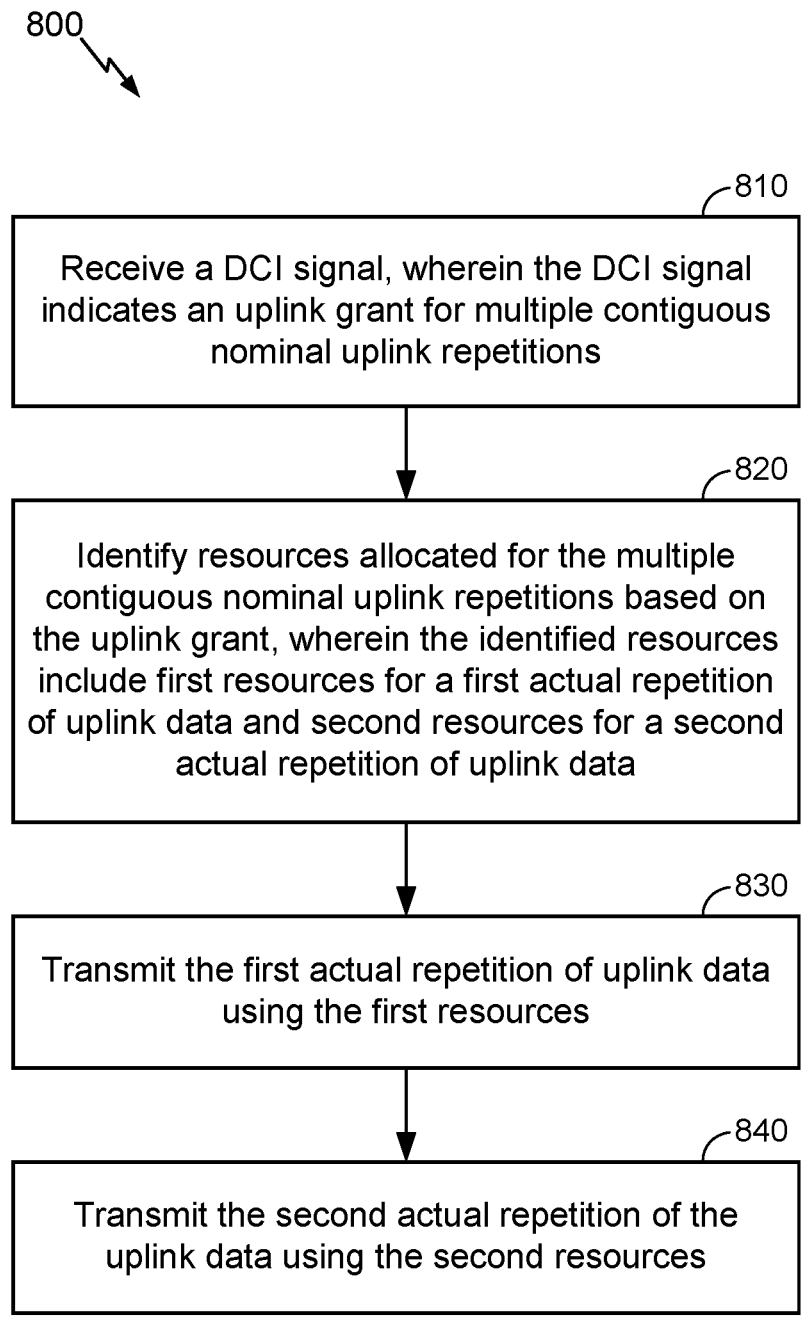
FIG. 8 generally illustrates a method for scheduling an uplink transmission in accordance with aspects of the disclosure.

FIG. 8 generally illustrates a method 800 for scheduling an uplink transmission in accordance with aspects of the disclosure. In an aspect, the method 800 may be performed by a UE, such as UE 302.

At 810, the UE receives a DCI signal, wherein the DCI signal indicates an uplink grant for multiple contiguous nominal uplink repetitions. The downlink control information may be received at the UE 302 from the base station 304. Operation 810 may be performed by, for example, the receiver 312, the processing system 332, the memory component 338, and/or the uplink scheduling manager 344 depicted in FIG. 3A, any or all of which may be considered means for performing this operation.

At 820, the UE identifies resources allocated for the multiple contiguous nominal uplink repetitions based on the uplink grant, wherein the identified resources include first resources for a first actual repetition of uplink data and second resources for a second actual repetition of uplink data. Operation 820 may be performed by, for example, the communication device 308, the processing system 332, the memory component 338, and/or the uplink scheduling manager 344 depicted in FIG. 3A, any or all of which may be considered means for performing this operation.

At 830, the UE transmits the first actual repetition of uplink data using the first resources. Operation 830 may be performed by, for example, the transmitter 310, the processing system 332, the memory component 338, and/or the uplink scheduling manager 344 depicted in FIG. 3A, any or all of which may be considered means for performing this operation.

At 840, the UE transmits the second actual repetition of the uplink data using the second resources. Operation 840 may be performed by, for example, the at least one transmitter 310, the processing system 332, the memory component 338, and/or the uplink scheduling manager 344 depicted in FIG. 3A, any or all of which may be considered means for performing this operation.

In an aspect, the first actual repetition may correspond to a first nominal repetition of the multiple contiguous nominal uplink repetitions, and/or the second actual repetition may correspond to a second nominal repetition of the multiple contiguous nominal uplink repetitions.

In an aspect, the first actual repetition may be a first segment of at least one nominal repetition of the multiple contiguous nominal uplink repetitions, and the second actual repetition may be a second segment of the at least one nominal repetition of the multiple contiguous nominal uplink repetitions.

In an aspect, the first actual repetition and the second actual repetition may be transmitted in the same slot. In an aspect, the first actual repetition and the second actual repetition may be transmitted in different slots.

In an aspect, the uplink data may be transmitted on a PUSCH.

In an aspect, the method 800 may further include (not shown) determining a TBS for the uplink grant. In that case, the TBS may be based on an actual length in symbols of the first repetition. Alternatively, the TBS may be based on a length of a first nominal repetition. In that case, the TBS may be further based on a number of symbols carrying DMRS scheduled during the first nominal repetition. Additionally or alternatively, the TBS may be further based on a number of usable symbols for the first nominal repetition.

In an aspect, the uplink grant may comprise a timing resource allocation that includes: a start symbol indicator indicating a particular symbol period value within a first slot, and a length indicator indicating a length value representing a particular number of symbol periods. The sum of the particular symbol period value and the length indicator may be greater than fourteen. In that case, the timing resource allocation may indicate one or more symbol periods in the first slot and one or more symbols in the second slot. The method 800 may further include (not shown) determining to transmit a sounding reference signal during one or more symbol periods associated with the timing resource allocation. The transmitting of the first repetition may occur prior to transmitting of the sounding reference signal, over a first number of symbol periods, the transmitting of the second repetition may occur after the transmitting of the sounding reference signal, over a second number of symbol periods, and the sum of the first number of symbol periods and the second number of symbol periods may be equal to the length value included in the timing resource allocation. Alternatively, the transmitting of the first repetition and the transmitting of the second repetition may occur prior to transmitting of the sounding reference signal, over a number of symbol periods corresponding to the length value included in the timing resource allocation, and a timing for transmission of the sounding reference signal may be determined in accordance with a slot offset parameter.

In an aspect, the uplink grant may comprise a frequency resource allocation that includes a number of resource blocks and/or resource elements. In that case, the method 800 may further include (not shown) identifying, from among of the multiple contiguous repetitions that includes the first repetition and the second repetition, a longest repetition that is transmitted over a greatest number of symbol periods, determining a total number of resource blocks and/or resource elements associated with the longest repetition based on the duration and the bandwidth associated with the longest repetition, identifying a shorter repetition that is shorter than the longest repetition, and increasing a bandwidth associated with the shorter repetition until the total number of resource blocks and/or resource elements associated with the shorter repetition matches the total number of resource blocks and/or resource elements associated with the longest repetition. In an aspect, the longest repetition may comprise a nominal repetition or an actual repetition.

In an aspect, the uplink grant may indicate an inter-slot frequency hopping pattern, the transmitting of the first repetition may comprise transmitting the first repetition at a first frequency in the inter-slot frequency hopping pattern, and the transmitting of the second repetition may comprise transmitting the second repetition at a second frequency in the inter-slot frequency hopping pattern.

In an aspect, the uplink grant may indicate an intra-slot frequency hopping pattern, the transmitting of the first repetition may comprise transmitting a first portion of the first repetition at a first frequency in the intra-slot frequency hopping pattern and a second portion of the first repetition at a second frequency in the intra-slot frequency hopping pattern, and the transmitting of the second repetition may comprise transmitting a first portion of the second repetition at a first frequency in the intra-slot frequency hopping pattern and a second portion of the second repetition at a second frequency in the intra-slot frequency hopping pattern.

In an aspect, the PUSCH mapping Type B may be applied to all of the multiple contiguous nominal uplink repetitions.

In an aspect, each of the multiple contiguous nominal uplink repetitions may be configured independently based on a length of actual repetitions in the time domain.

In an aspect, the UE may be configured with multiple DMRS locations. The multiple DMRS locations may be determined as a function of a start symbol and/or length of each actual repetition. The downlink control information signal may indicate which of the multiple DMRS locations are to be used. The multiple DMRS locations may be signaled as a function of a number of ports and/or a pattern used for a first PUSCH.

As discussed herein, an integrated circuit may include an application-specific integrated circuit (ASIC), a processor, software, other related components, or any combination thereof. Thus, the functions performed by these components as described herein may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module. One skilled in the art will recognize in this disclosure an algorithm represented in the prose described above, as well in sequences of actions that may be represented by pseudocode.

In addition, the components and functions described herein may be implemented using any suitable means. Such means also may be implemented, at least in part, using corresponding structure as taught herein. For example, the components described above may correspond to similarly designated "code for" functionality. Thus, in some aspects one or more of such means may be implemented using one or more of processor components, integrated circuits, or other suitable structure as taught herein.

The terminology used herein is for the purpose of describing particular embodiments only and not to limit any embodiments disclosed herein. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof. Similarly, the phrase "based on" as used herein does not necessarily preclude influence of other factors and should be interpreted (unless specified otherwise) as "based at least in part on" rather than, for example, "based solely on." It will be understood that terms such as "top" and "bottom," "left" and "right," "vertical" and "horizontal," etc., are relative terms used strictly in relation to one another, and do not express or imply any relation with respect to gravity, a manufacturing device used to manufacture the components described herein, or to some other device to which the components described herein are coupled, mounted, etc.

It should be further understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not imply that there are only two elements and further does not imply that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements."

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random-access memory (RAM), flash memory, read-only memory (ROM), erasable programmable read-only memory (EPROM), electrically erasable programmable read-only memory (EEPROM), registers, hard disk, a removable disk, a CD-ROM, or any other form of non-transitory storage medium known in the art. As used herein the term "non-transitory" does not exclude any physical storage medium or memory and particularly does not exclude dynamic memory (e.g., RAM) but rather excludes only the interpretation that the medium can be construed as a transitory propagating signal. An example storage medium is coupled to the processor such that the processor can read information from, and write information to, the storage medium. In the alternative, the storage medium may be integral to the processor (e.g., cache memory).

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. A method of wireless communication performed by a user equipment (UE), comprising:
receiving a downlink control information signal, wherein the downlink control information signal indicates an uplink grant for multiple contiguous uplink repetitions, the multiple contiguous uplink repetitions being contiguous across one or more slot boundaries;
identifying resources allocated for the multiple contiguous uplink repetitions based on the uplink grant, wherein the identified resources include first resources for a first repetition of uplink data and second resources for a second repetition of uplink data;
transmitting the first repetition of uplink data using the first resources; and
transmitting the second repetition of the uplink data using the second resources.

2. The method of claim 1, wherein the first repetition and the second repetition are transmitted in the same slot.

3. The method of claim 1, wherein the first repetition and the second actual repetition are transmitted in different slots.

4. The method of claim 1, wherein the uplink data is transmitted on a physical uplink shared channel (PUSCH).

5. The method of claim 1, further comprising:
determining a transport block size (TBS) for the uplink grant.

6. The method of claim 5, wherein the TBS is based on a length in symbols of the first repetition.

7. The method of claim 5, wherein the TBS is based on a length of a first repetition.

8. The method of claim 7, wherein the TBS is further based on a number of symbols carrying demodulation reference signals (DMRS) scheduled during the first repetition.

9. The method of claim 7, wherein the TBS is further based on a number of usable symbols for the first repetition.

10. The method of claim 1, wherein the uplink grant comprises a timing resource allocation that includes:
a start symbol indicator indicating a value of a start symbol within a first slot; and
a length indicator indicating a length of a number of symbols;
wherein a sum of the value of the start symbol and the length indicator is greater than fourteen.

11. The method of claim 10, wherein the timing resource allocation indicates one or more symbols in the first slot and one or more symbols in the second slot.

12. The method of claim 10, further comprising determining to transmit a sounding reference signal during one or more symbols associated with the timing resource allocation, wherein:
the transmitting of the first repetition occurs prior to transmitting of the sounding reference signal, over a first number of symbols;
the transmitting of the second repetition occurs after the transmitting of the sounding reference signal, over a second number of symbols; and
a sum of the first number of symbols and the second number of symbols is equal to the length of the number of symbols included in the timing resource allocation.

13. The method of claim 10, further comprising determining to transmit a sounding reference signal during one or more symbol associated with the timing resource allocation, wherein:
the transmitting of the first repetition and the transmitting of the second repetition occur prior to transmitting of the sounding reference signal, over the length of the number of symbols included in the timing resource allocation; and
a timing for transmission of the sounding reference signal is determined in accordance with a slot offset parameter.

14. The method of claim 1, wherein the uplink grant comprises a frequency resource allocation that includes a number of resource blocks or resource elements.

15. The method of claim 14, further comprising:
identifying, from among of the multiple contiguous repetitions that includes the first repetition and the second repetition, a longest repetition that is transmitted over a greatest number of symbols;
determining a total number of resource blocks or resource elements associated with the longest repetition based on the duration and the bandwidth associated with the longest repetition;
identifying a shorter repetition that is shorter than the longest repetition; and
increasing a bandwidth associated with the shorter repetition until a total number of resource blocks or resource elements associated with the shorter repetition matches the total number of resource blocks or resource elements associated with the longest repetition.

16. The method of claim 1, wherein:
the uplink grant indicates an inter-slot frequency hopping pattern;
the transmitting of the first repetition comprises transmitting the first repetition at a first frequency in the inter-slot frequency hopping pattern; and
the transmitting of the second repetition comprises transmitting the second repetition at a second frequency in the inter-slot frequency hopping pattern.

17. The method of claim 1, wherein:
the uplink grant indicates an intra-slot frequency hopping pattern;
the transmitting of the first repetition comprises transmitting a first portion of the first repetition at a first frequency in the intra-slot frequency hopping pattern and a second portion of the first repetition at a second frequency in the intra-slot frequency hopping pattern; and
the transmitting of the second repetition comprises transmitting a first portion of the second repetition at a first frequency in the intra-slot frequency hopping pattern and a second portion of the second repetition at a second frequency in the intra-slot frequency hopping pattern.

18. The method of claim 1, wherein PUSCH mapping Type B is applied to all of the multiple contiguous nominal uplink repetitions.

19. The method of claim 1, wherein each of the multiple contiguous nominal uplink repetitions is configured independently based on a length of repetitions in the time domain.

20. The method of claim 1, wherein the UE is configured with multiple DMRS locations.

21. The method of claim 20, wherein the multiple DMRS locations are determined as a function of a starting symbol and/or length of each repetition.

22. The method of claim 20, wherein the downlink control information signal indicates which of the multiple DMRS locations are to be used.

23. The method of claim 20, wherein the multiple DMRS locations are signaled as a function of a number of ports or a pattern used for a first PUSCH.

24. A user equipment (UE), comprising:
at least one transceiver; and
at least one processor, the at least one processor configured to:
receive, via the at least one transceiver, a downlink control information signal, wherein the downlink control information indicates an uplink grant for multiple contiguous uplink repetitions, the multiple contiguous uplink repetitions being contiguous across one or more slot boundaries;
identify resources allocated for the multiple contiguous uplink repetitions based on the uplink grant, wherein the identified resources include first resources for a first repetition of uplink data and second resources for a second repetition of uplink data;
cause the at least one transceiver to transmit the first repetition of uplink data using the first resources; and
cause the at least one transceiver to transmit the second repetition of the uplink data using the second resources.

25. The UE of claim 24, wherein the first repetition and the second repetition are transmitted in the same slot.

26. The UE of claim 24, wherein the first repetition and the second repetition are transmitted in different slots.

27. The UE of claim 24, wherein the uplink data is transmitted on a physical uplink shared channel (PUSCH).

28. The UE of claim 24, wherein the at least one processor is further configured to:

determine a transport block size (TBS) for the uplink grant.

29. The UE of claim 28, wherein the TBS is based on a length in symbols of the first repetition.

30. The UE of claim 28, wherein the TBS is based on a length of a first repetition.

31. The UE of claim 30, wherein the TBS is further based on a number of symbols carrying demodulation reference signals (DMRS) scheduled during the first repetition.

32. The UE of claim 30, wherein the TBS is further based on a number of usable symbols for the first repetition.

33. The UE of claim 24, wherein the uplink grant comprises a timing resource allocation that includes:
a start symbol indicator indicating a value of a start symbol within a first slot; and
a length indicator indicating a length of a number of symbols;
wherein a sum of the value of the start symbol and the length indicator is greater than fourteen.

34. The UE of claim 33, wherein the timing resource allocation indicates one or more symbols in the first slot and one or more symbols in the second slot.

35. The UE of claim 33, wherein the at least one processor is further configured to determine to transmit a sounding reference signal during one or more symbols associated with the timing resource allocation, wherein:
transmission of the first repetition occurs prior to transmission of the sounding reference signal, over a first number of symbols;
transmission of the second repetition occurs after transmission of the sounding reference signal, over a second number of symbols; and
a sum of the first number of symbols and the second number of symbols is equal to the length value included in the timing resource allocation.

36. The UE of claim 33, wherein the at least one processor is further configured to determine to transmit a sounding reference signal during one or more symbols associated with the timing resource allocation, wherein:
transmission of the first repetition and transmission of the second repetition occur prior to transmission of the sounding reference signal, over a number of symbols corresponding to the length value included in the timing resource allocation; and
a timing for transmission of the sounding reference signal is determined in accordance with a slot offset parameter.

37. The UE of claim 24, wherein the uplink grant comprises a frequency resource allocation that includes a number of resource blocks and/or resource elements.

38. The UE of claim 37, wherein the at least one processor is further configured to:
identify, from among of the multiple contiguous repetitions that includes the first repetition and the second repetition, a longest repetition that is transmitted over a greatest number of symbols;
determine a total number of resource blocks or resource elements associated with the longest repetition based on the duration and the bandwidth associated with the longest repetition;
identify a shorter repetition that is shorter than the longest repetition; and
increase a bandwidth associated with the shorter repetition until a total number of resource blocks or resource elements associated with the shorter repetition matches the total number of resource blocks or resource elements associated with the longest repetition.

39. The UE of claim 24, wherein:
the uplink grant indicates an inter-slot frequency hopping pattern;
the transmitting of the first repetition comprises transmitting the first repetition at a first frequency in the inter-slot frequency hopping pattern; and
the transmitting of the second repetition comprises transmitting the second repetition at a second frequency in the inter-slot frequency hopping pattern.

40. The UE of claim 24, wherein:
the uplink grant indicates an intra-slot frequency hopping pattern;
transmission of the first repetition comprises transmission of a first portion of the first repetition at a first frequency in the intra-slot frequency hopping pattern and a second portion of the first repetition at a second frequency in the intra-slot frequency hopping pattern; and
transmission of the second repetition comprises transmission of a first portion of the second repetition at a first frequency in the intra-slot frequency hopping pattern and a second portion of the second repetition at a second frequency in the intra-slot frequency hopping pattern.

41. The UE of claim 24, wherein PUSCH mapping Type B is applied to all of the multiple contiguous nominal uplink repetitions.

42. The UE of claim 24, wherein each of the multiple contiguous nominal uplink repetitions is configured independently based on a length of repetitions in the time domain.

43. The UE of claim 24, wherein the UE is configured with multiple DMRS locations.

44. The UE of claim 43, wherein the multiple DMRS locations are determined as a function of a start symbol or length of each repetition.

45. The UE of claim 43, wherein the downlink control information signal indicates which of the multiple DMRS locations are to be used.

46. The UE of claim 43, wherein the multiple DMRS locations are signaled as a function of a number of ports and/or a pattern used for a first PUSCH.

* * * * *